(12) United States Patent
Koharcheck et al.

(10) Patent No.: US 7,145,256 B2
(45) Date of Patent: Dec. 5, 2006

(54) LIGHTING SYSTEM FOR A BICYCLE

(75) Inventors: Alan William Koharcheck, 9216 Olive St., Temple City, CA (US) 91780; Jeffrey Kenneth Ratzloff, Temple City, CA (US)

(73) Assignee: Alan William Koharcheck, Ivans, UT (US)

( * ) Notice: Subject to any disclaimer, the term of this patent is extended or adjusted under 35 U.S.C. 154(b) by 154 days.

(21) Appl. No.: 10/958,278

(22) Filed: Oct. 5, 2004

(65) Prior Publication Data

US 2006/0072330 A1 Apr. 6, 2006

(51) Int. Cl.
*B62J 6/00* (2006.01)
(52) U.S. Cl. .................. 290/1 R; 315/77; 315/78
(58) Field of Classification Search .......... 315/77, 315/78
See application file for complete search history.

(56) References Cited

U.S. PATENT DOCUMENTS

| | | | |
|---|---|---|---|
| 3,171,058 A * | 2/1965 | Ono ................. | 315/78 |
| 3,792,307 A | 2/1974 | Baker | |
| 3,894,281 A | 7/1975 | Bloomfield | |
| 3,904,920 A | 9/1975 | Griffith | |
| 4,555,656 A | 11/1985 | Ryan | |
| 4,950,971 A | 8/1990 | Hegi et al. | |
| 5,015,918 A | 5/1991 | Copeland | |
| 5,247,430 A * | 9/1993 | Schwaller ........ | 362/473 |
| 5,455,485 A * | 10/1995 | Kutter .............. | 315/78 |
| 5,457,612 A | 10/1995 | Carter | |
| 5,510,657 A | 4/1996 | Morita | |
| 5,857,762 A * | 1/1999 | Schwaller ........ | 362/473 |
| 6,157,165 A | 12/2000 | Kinoshita et al. | |
| 6,418,041 B1 * | 7/2002 | Kitamura ......... | 363/125 |
| 2004/0075420 A1 | 4/2004 | Uno | |
| 2004/0105273 A1 | 6/2004 | Takeda | |

FOREIGN PATENT DOCUMENTS

| | | | |
|---|---|---|---|
| GB | 2026791 A * | 2/1980 | |
| GB | 2 202 097 | 9/1988 | |
| GB | 2202097 A * | 9/1988 | |
| JP | 59-230835 | 12/1984 | |
| JP | 05096987 A * | 4/1993 | |
| JP | 5-162674 | 6/1993 | |
| JP | 5-238447 | 9/1993 | |
| JP | 11301547 A * | 11/1999 | |

* cited by examiner

*Primary Examiner*—Joseph Waks
(74) *Attorney, Agent, or Firm*—Hogan & Hartson LLP

(57) ABSTRACT

A lighting system for a bicycle. A lamp and a beam are mounted to the bicycle. A generator is mounted to the beam such that the beam holds the generator in position to be frictionally driven by contact with a bicycle wheel. The generator provides a three-phase output voltage. A sensor monitors the generator and provides an output signal proportional to the speed of the bicycle. A first sensing circuit receives the output signal from the sensor and provides a first control signal when the output signal exceeds a first predetermined value. The first control signal is operative to change the output voltage from the three-phase output voltage to a single-phase output voltage to prevent damage to the system.

39 Claims, 21 Drawing Sheets

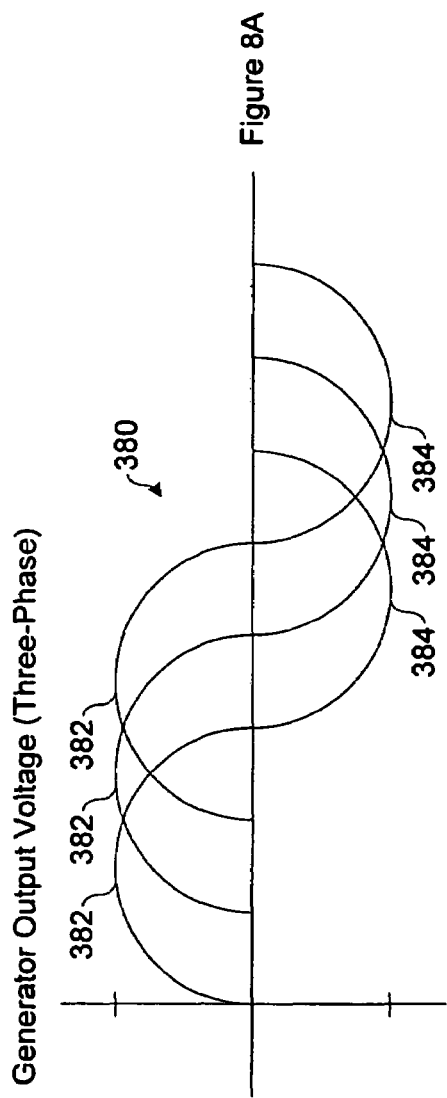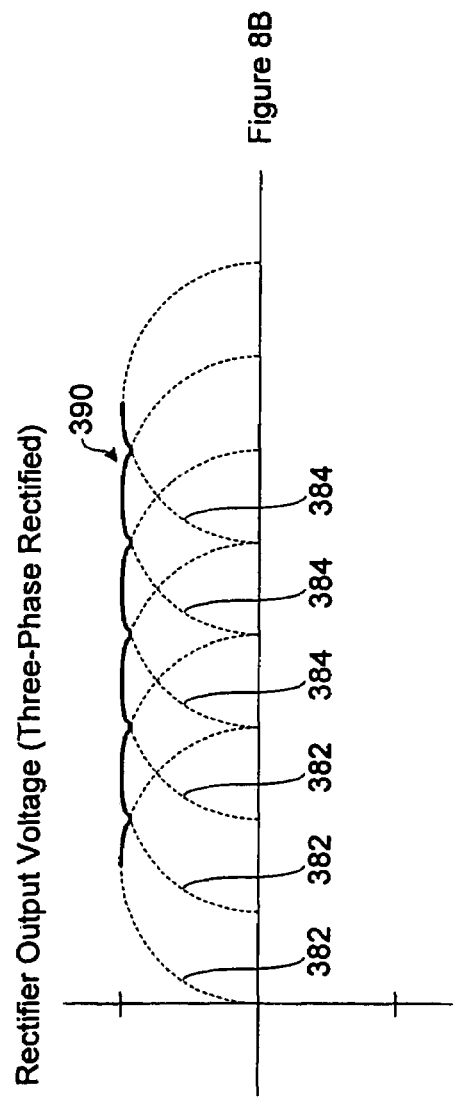

LIGHTING SYSTEM FOR A BICYCLE

BACKGROUND OF THE INVENTION

1. Field of the Invention

The present invention relates to a lighting system for a bicycle.

2. Description of Related Art

Current lighting systems for bicycles are powered by batteries or generators with batteries being most common. In battery-powered systems, headlamps provide light output with the higher performance lamps demanding more power, size, and cost. The battery must be of significant size to provide the necessary power over the length of time needed. Weight, run-time, and cost all become limiting performance factors. A long lasting battery is often heavier and more costly. In general, battery systems are conveniently removed, and they provide necessary light output over a limited time frame. A key problem with battery systems is maintenance. Typically, the battery must be recharged after each use, and this often takes a significant amount of time of up to 4 times longer than the use of the battery. In addition, a remote battery charger must usually be utilized to charge the battery, which adds to the inconvenience of battery systems.

Conventional generator systems are currently more limited in use, and the models that are offered have several drawbacks. Such systems are inefficient in their drive systems including their power output and power conversion. They do not offer different power delivery solutions for stationary performance, low speed performance and high speed performance. Conventional generator systems are typically not easy to remove and replace. In addition, the generator of these systems is typically driven by the tire or by a gearing device in the hub. Conventional tire driven generator systems are noisy and rough, and their designs typically add to the inefficiency of the overall lighting system. Inadequate light levels and excessive drag on the bicycle are typical. They can however, provide light output over an extended period of time as long as the rider is riding his bike.

Current bicycle riders and sport enthusiasts have the need for a long lasting, low weight, highly efficient, onboard lighting system for such activities as endurance races, training, recreational riding after work, commuting and others. Driving forces determining purchases include light output, time of output, ease of removal and replacement, weight, convenience, required maintenance, and cost.

SUMMARY OF THE INVENTION

The present invention is directed to a bicycle lighting system that is long lasting, low weight, highly efficient, and powered by a generator driven by a drive wheel rolling against a portion of the rear wheel. A highly efficient power converter and generator provide high light output from low to high speeds. Operation at high speeds is possible without the system becoming damaged, light output being affected, or significant amounts of drag being placed on the bike in the form of electromechanical inefficiency as is the standard practice in conventional systems.

The invention provides a mechanism that is attached to the frame at two points: the brake caliper pivot and the rear axle. These two locations are common in many modern bikes thus providing for a universal fit and quick and simple removal or attachment of the mechanism. In addition, a small onboard battery provides light during periods when the bike is stationary and a charging system that keeps the battery charged.

One embodiment of the invention is a lighting system for a bicycle having a bicycle frame and at least two wheels. The lighting system includes a structural beam mounted to a portion of the bicycle frame. A generator is mounted to the beam such that the beam holds the generator in position to be frictionally driven by contact with a portion of the rear wheel. The generator provides a three-phase output voltage. A sensor monitors the generator and provides an output signal proportional to the speed of the bicycle. A first sensing circuit receives the output signal from the sensor and provides a first control signal when the output signal exceeds a first predetermined value operative to change the output voltage from the three-phase voltage to a single-phase voltage to thereby prevent damage to the system.

Another embodiment of the invention is a voltage control system for a bicycle having a bicycle frame and at least two wheels. The voltage control system includes a three-phase generator driven by frictional engagement against a wheel of the bicycle. The generator provides a three-phase output voltage in the form of sine waves with positive and negative halves. A three-phase full-bridge rectifier receives the three-phase output voltage of the generator and inverts the negative halves of the sine waves generated. The rectifier provides a DC output voltage proportional to a three-phase line-to-line voltage. A DC-to-DC converter changes the DC output voltage from the rectifier to a first working voltage. A lamp attached to a portion of the bicycle receives the first working voltage from the converter, and a sensor monitors the generator and provides an output signal proportional to the speed of the bicycle. A first sensing circuit receives the output signal from the sensor and provides a first control signal at a first predetermined value of the output signal from the sensor. A first relay connected between the generator and the rectifier is connected to the first sensing circuit to receive the first control signal. The first relay, during a state of increasing bicycle speed, changes the output voltage of the generator from the three-phase line-to-line voltage to a single-phase line-to-neutral voltage when the first control signal is received from the first sensing circuit, thereby reducing the DC output voltage from the rectifier to avoid damage to the converter while supplying the first working voltage to the lamp.

Another embodiment of the invention is a generator mounting system for a bicycle having at least one rear strut extending from a bicycle frame for supporting a mount for a rear wheel. A beam for supporting a generator extends generally alongside the rear strut of the bicycle with a first beam end mounted to the rear wheel mount and a second beam end mounted to the bicycle frame outbound of the wheel. The beam holds the generator in position to be frictionally driven by contact with a portion of the rear wheel.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 8A is a diagram of a generator output voltage.

FIG. 8B is a diagram of a rectifier output voltage.

DETAILED DESCRIPTION OF THE INVENTION

Reference will now be made to the drawings wherein like numerals refer to like parts throughout.

Figure 1A:
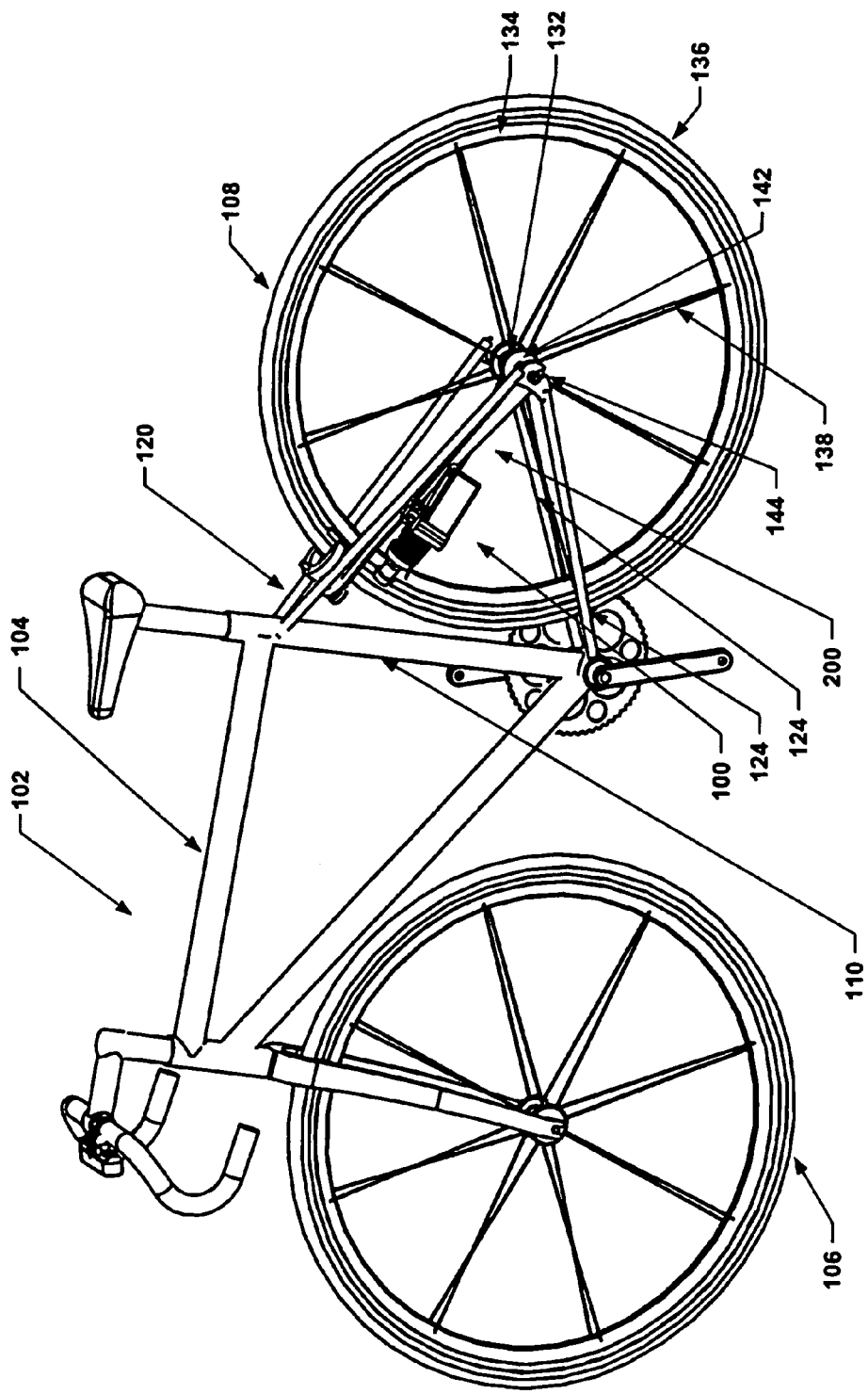
FIG. 1A is a side perspective view of one embodiment of a lighting system attached to a rear portion of a bicycle.
Figure 1B:
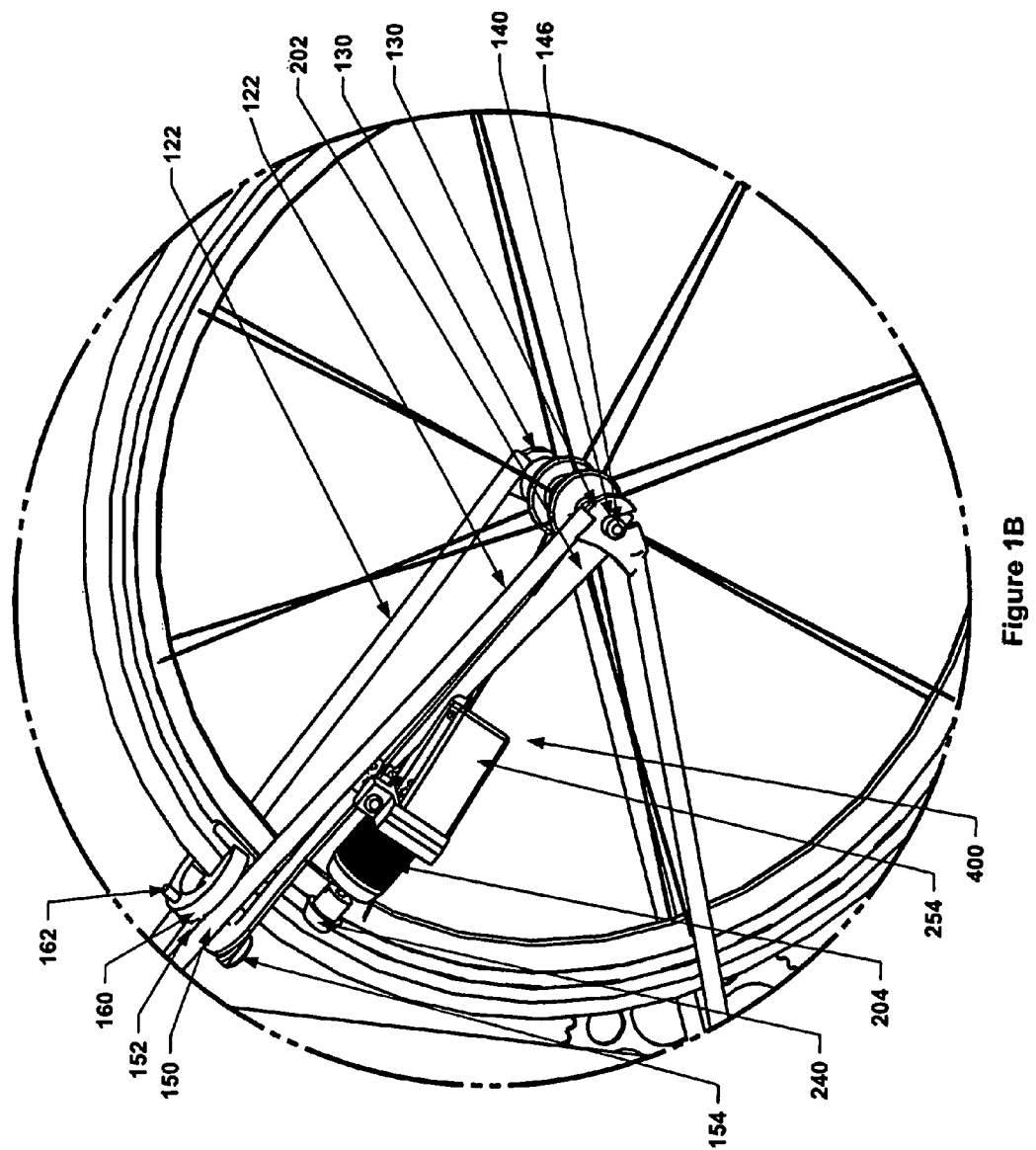
FIG. 1B is another side perspective view of the lighting system of FIG. 1A.

FIG. 1A illustrates one embodiment of a lighting system 100 for a bicycle 102 having a bicycle frame 104 and front and rear wheels 106, 108. FIG. 1B is another side perspective view of the lighting system of FIG. 1A. Frame 104 includes a seat post 110 and one or more rear struts 120 extending from seat post 110. Struts 120 support rear wheel mounts 130 for mounting rear wheel 108 to frame 104. Rear struts 120 include upper and lower arms 122, 124 that extend from seat post 110 towards each other to be joined at rear wheel mounts 130. Bicycle 102 may comprise a road bike, mountain bike or any other type of cycle.

Rear wheel 108 comprises rear axle 132, rear rim 134, and rear tire 136. Rear tire 136 is mounted to rim 134, and rim 134 is attached to axle 132 via a plurality of spokes 138.

Rear axle 132 includes a shaft 140 that extends through a central portion of a body 142 of rear axle 132 for mounting to rear wheel mounts 130. Rear wheel mounts 130 include side mount 144 that is adapted to receive shaft 140 such that rear wheel mount 130 extends around shaft 140. The ends of shaft 140 are threaded to receive fasteners 146, such as nuts, for clamping rear axle 132 to rear wheel mounts 130.

Figure 2:
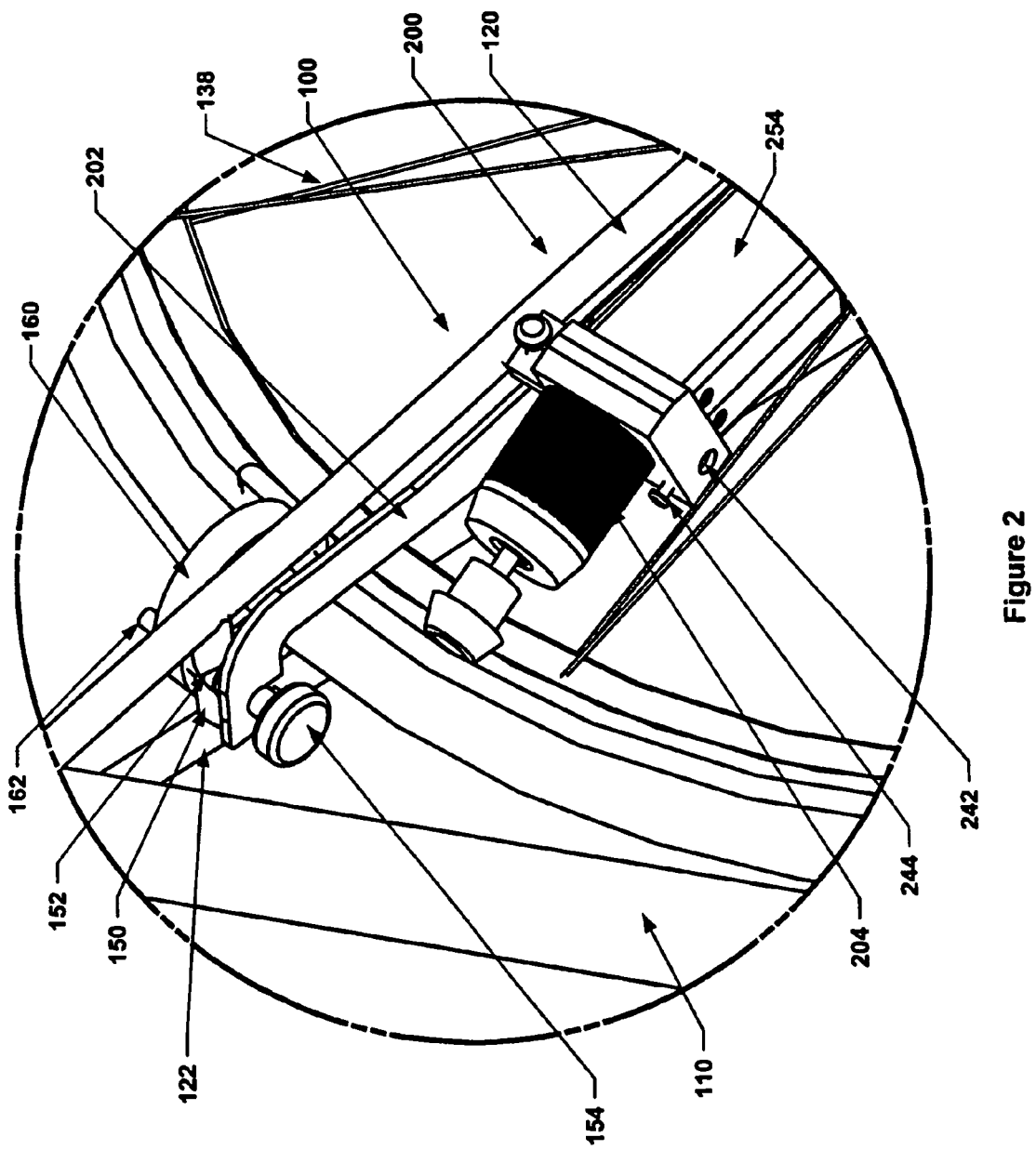
FIG. 2 is a bottom perspective view of the lighting system of FIG. 1A.

FIG. 2 is a bottom perspective view of lighting system 100. As shown in FIGS. 1A–2B, bicycle frame 104 includes a cross member 150 extending between upper strut arms 122 and positioned outbound of rear wheel 108 for securing a rear caliper brake 160 thereto. Cross member 150 includes a mounting aperture 152 formed therein for receiving a shaft 162 of rear caliper brake 160. Shaft 162 extends through mounting aperture 152 and includes a threaded outer surface at one end thereof that receives a fastener 154, such as a nut, for clamping brake 160 to cross member 150.

Figure 3A:
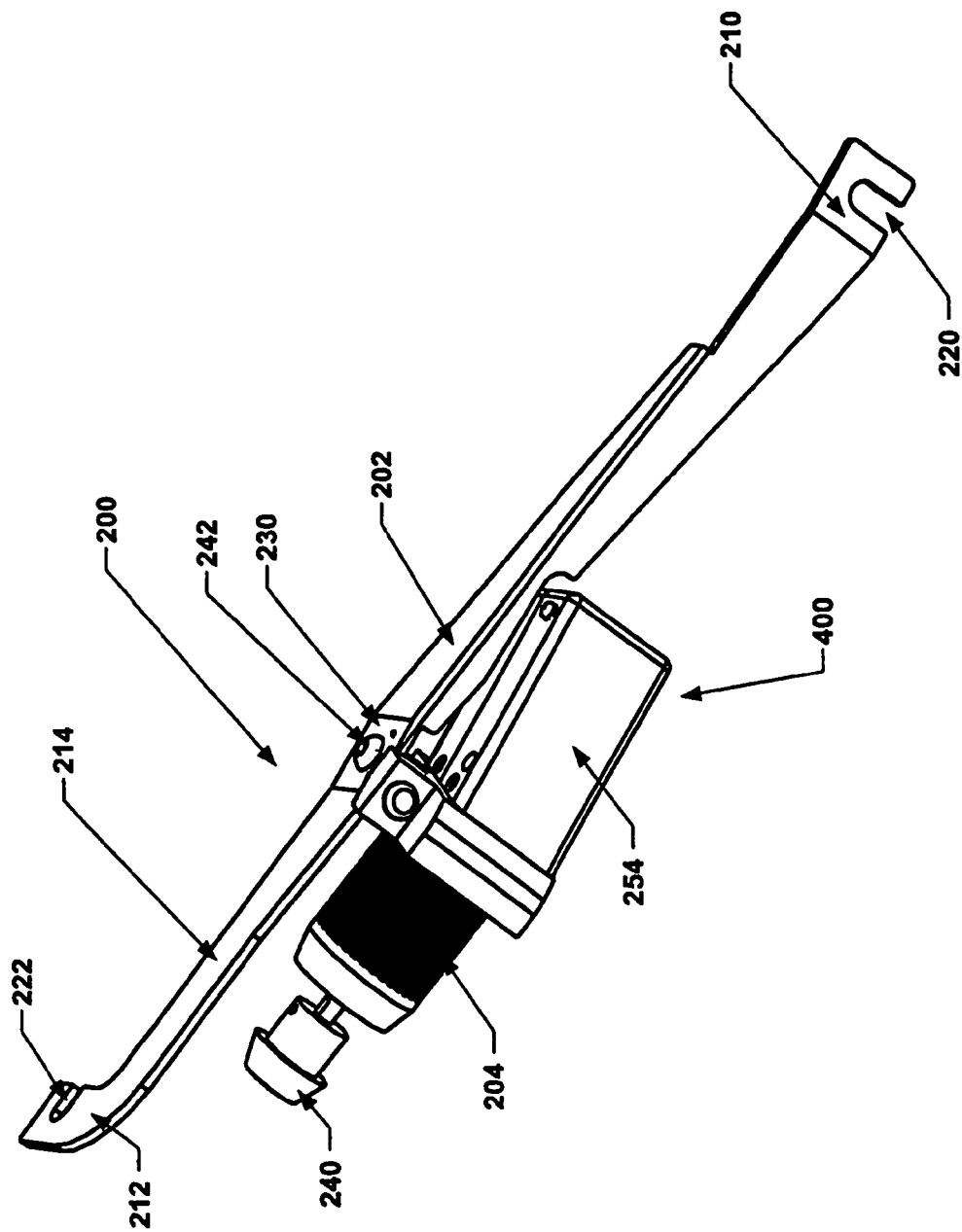
FIGS. 3A–3B are side perspective views of the lighting system of FIG. 1A.
Figure 3B:
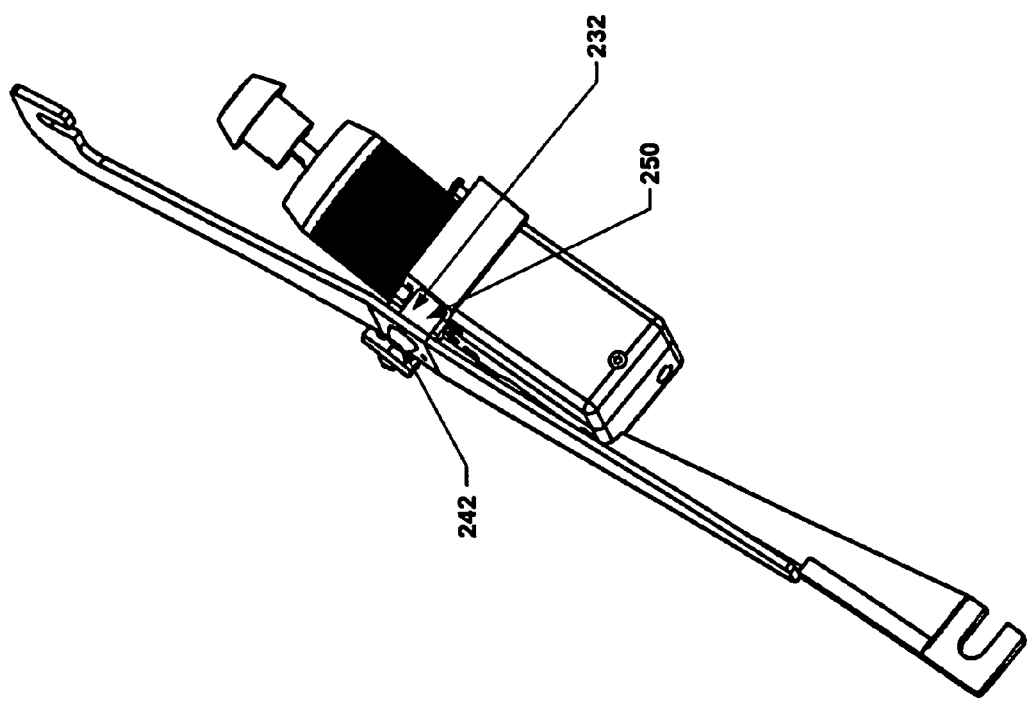

FIG. 3A is a side perspective view of lighting system 100. FIG. 3B is another side perspective view of the lighting system 100. As shown in FIGS. 1A–3B, lighting system 100 includes a mounting system 200 and a voltage control system 400. Mounting system 200 includes a support beam 202 that parallels upper arm 122 of rear strut 120 for mounting an accessory thereto, such as, in this instance, a power generator 204. Support beam 202 extends between seat post 110 to rear wheel mounts 130.

Figure 4A:
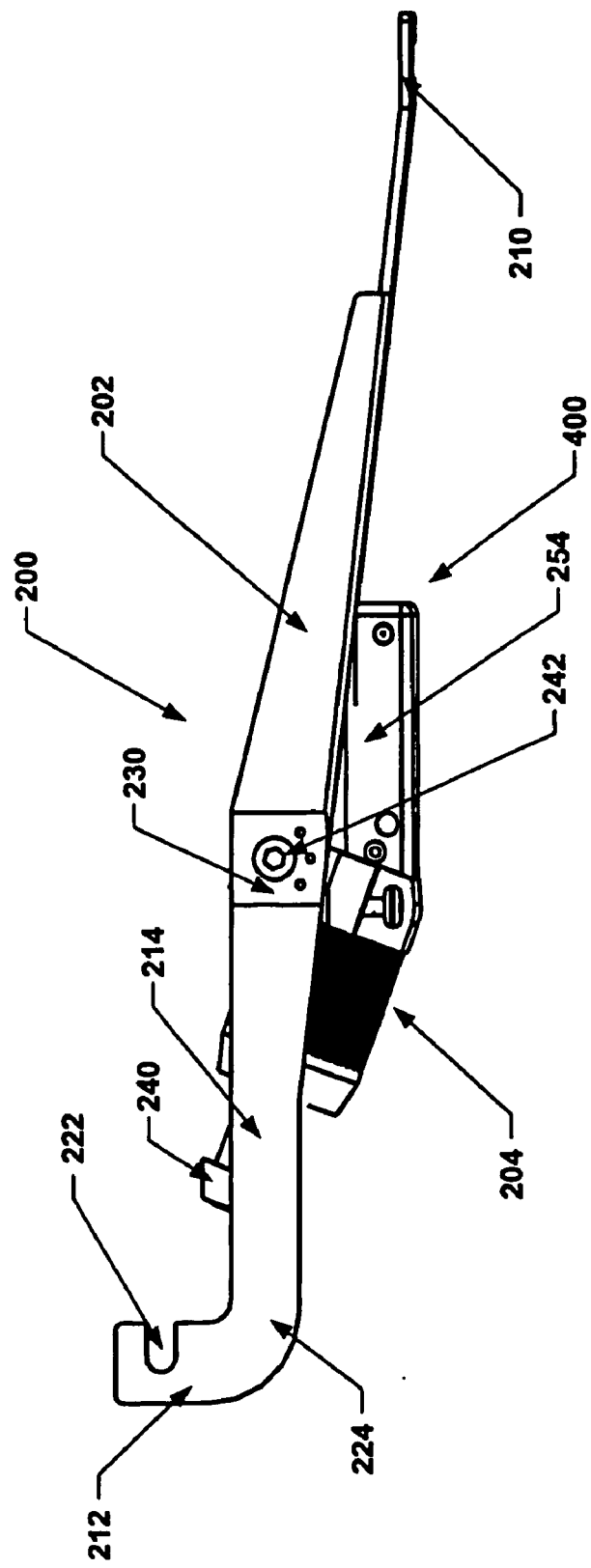
FIG. 4A is a top view of the lighting system of FIG. 1A.
Figure 4B:
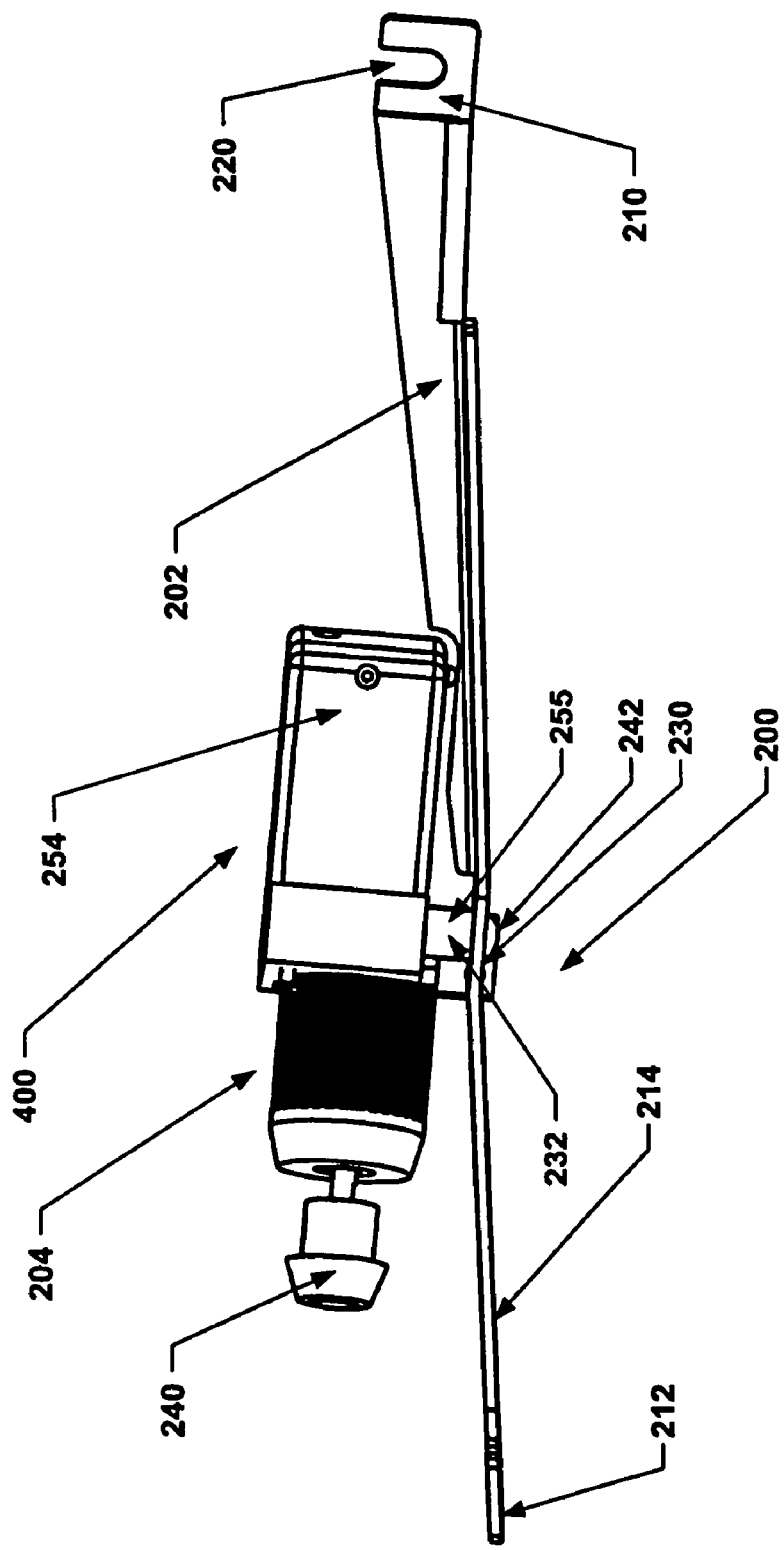
FIG. 4B is a side view of the lighting system of FIG. 1A.

FIG. 4A is a top view of lighting system 100, and FIG. 4B is a side view of lighting system 100. As shown in FIGS. 3A–4B, support beam 202 includes an elongate portion 214 extending between first and second beam ends 210, 212. Support beam 202 may have a non-cylindrical cross-section, as shown, or any other appropriate cross-section.

First beam end 210 includes a downwardly facing, side open aperture 220 adapted to extend around rear axle shaft 140 such that end 210 is clamped between rear axle body 142 and rear wheel mount 130 when rear wheel 108 is fastened to rear wheel mount 130.

Second beam end 212 includes a side open aperture 222 adapted to receive rear caliper brake shaft 162 such that end 212 is clamped between cross member 150 and rear caliper brake body 164. End 212 is clamped in position when brake 160 is fastened to cross member 150. Alternately, second beam end 212 may be adapted to receive a bolt or other suitable fastener.

As further shown in FIGS. 3A–4B, second beam end 212 extends 90° from the plane of the first beam end 210. Moreover, the second beam end 212 extends from the elongate portion 214 of the support beam 202 in a substantially perpendicular manner via, in one embodiment, a bend 224. This configuration allows the first and second beam ends 212, 212 to be securely clamped to the rear axle 132 and the rear caliper brake 160 of the bicycle frame 104, respectively.

Support beam elongate portion 214 includes a generator mounting aperture 230 positioned between beam ends 210, 212. Generator 204 is secured to support beam 202 through a pivotal connection 232 so as to allow a drive wheel 240 on generator 204 to contact a portion of rear wheel 108, such as a sidewall of rim 134 or rear tire 136. Generator mounting aperture 230 receives bolt 242 in a manner that allows pivotal connection 232 to be established. Bolt 242 is secured to support beam 202 via a fastener 244, such as a nut. The generator wheel to rear wheel ratio is approximately 26 to 1.

A torsion spring 250 extends around pivotal connection 232 between support beam 202 and generator 204. Spring 250 torsionally biases drive wheel 240 against a portion of rear wheel 108 so that drive wheel 240 remains in contact with rear wheel 108 and provides generating power when rear wheel 108 is in motion.

Housing 254 encloses voltage control system 400 and is secured to generator 204 at a position opposite drive wheel 240. This allows electrical connections between generator 204 and voltage control system 400 to be made without interference from the rotation of rear wheel 108.

Figure 5A:
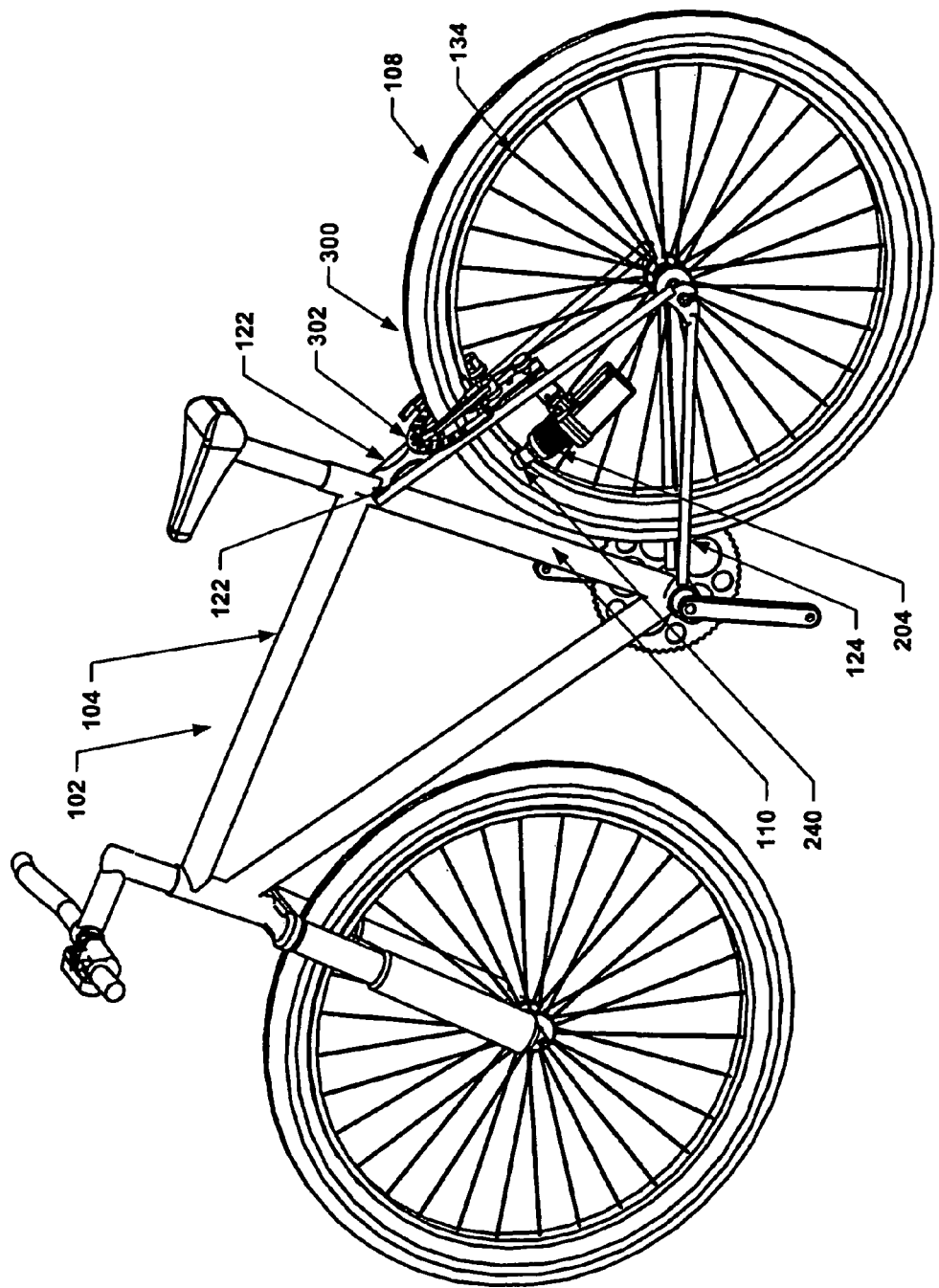
FIGS. 5A–5B are top perspective views of another embodiment of a lighting system.
Figure 5B:
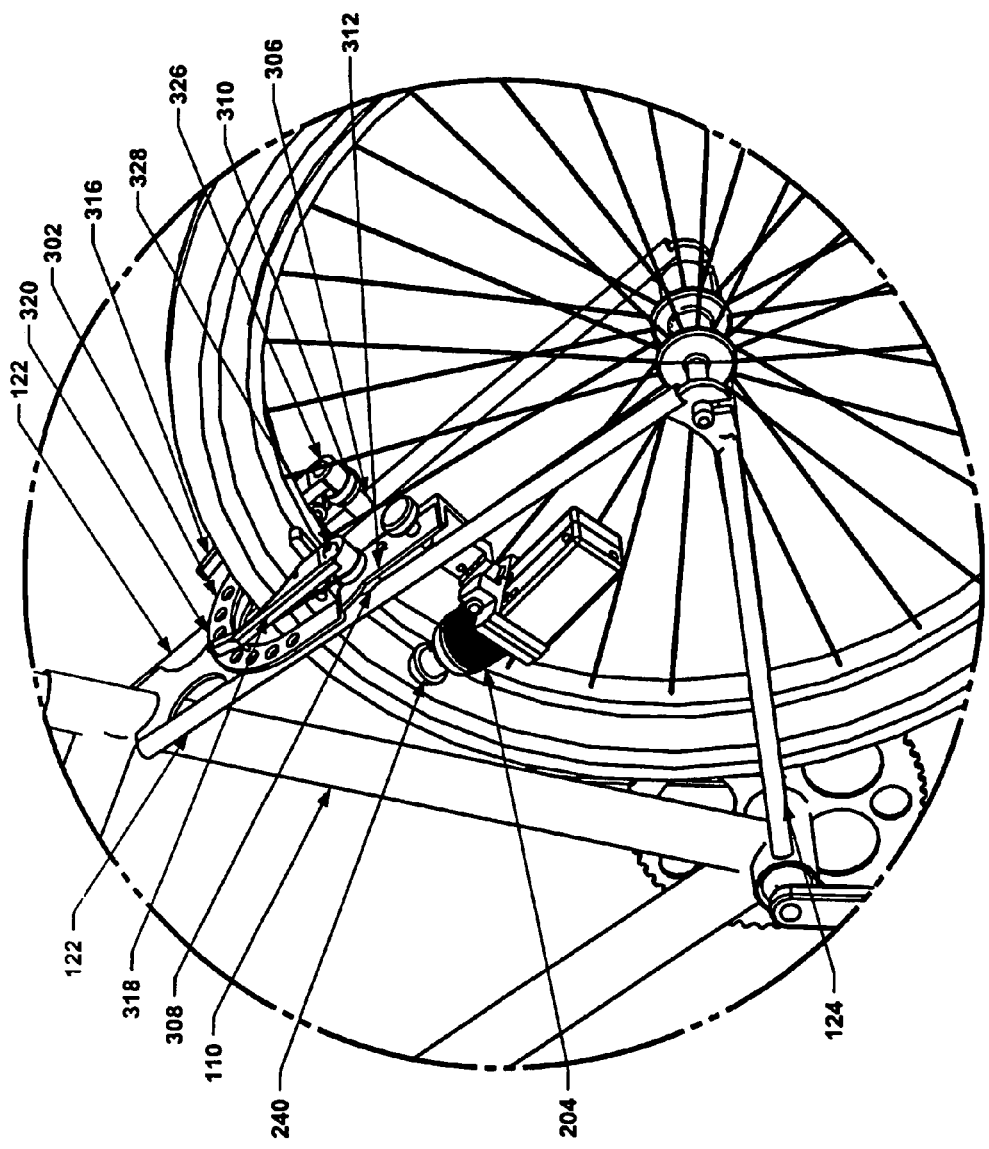

FIGS. 5A–5B are top perspective views of another embodiment of the invention. This lighting system 300 is similar to lighting system 100 of FIGS. 1A–4B, but has a different support beam configuration. Lighting system 300 includes a support beam 302 having a U-shaped portion 320 extending between ends 310, 312.

Figure 6A:
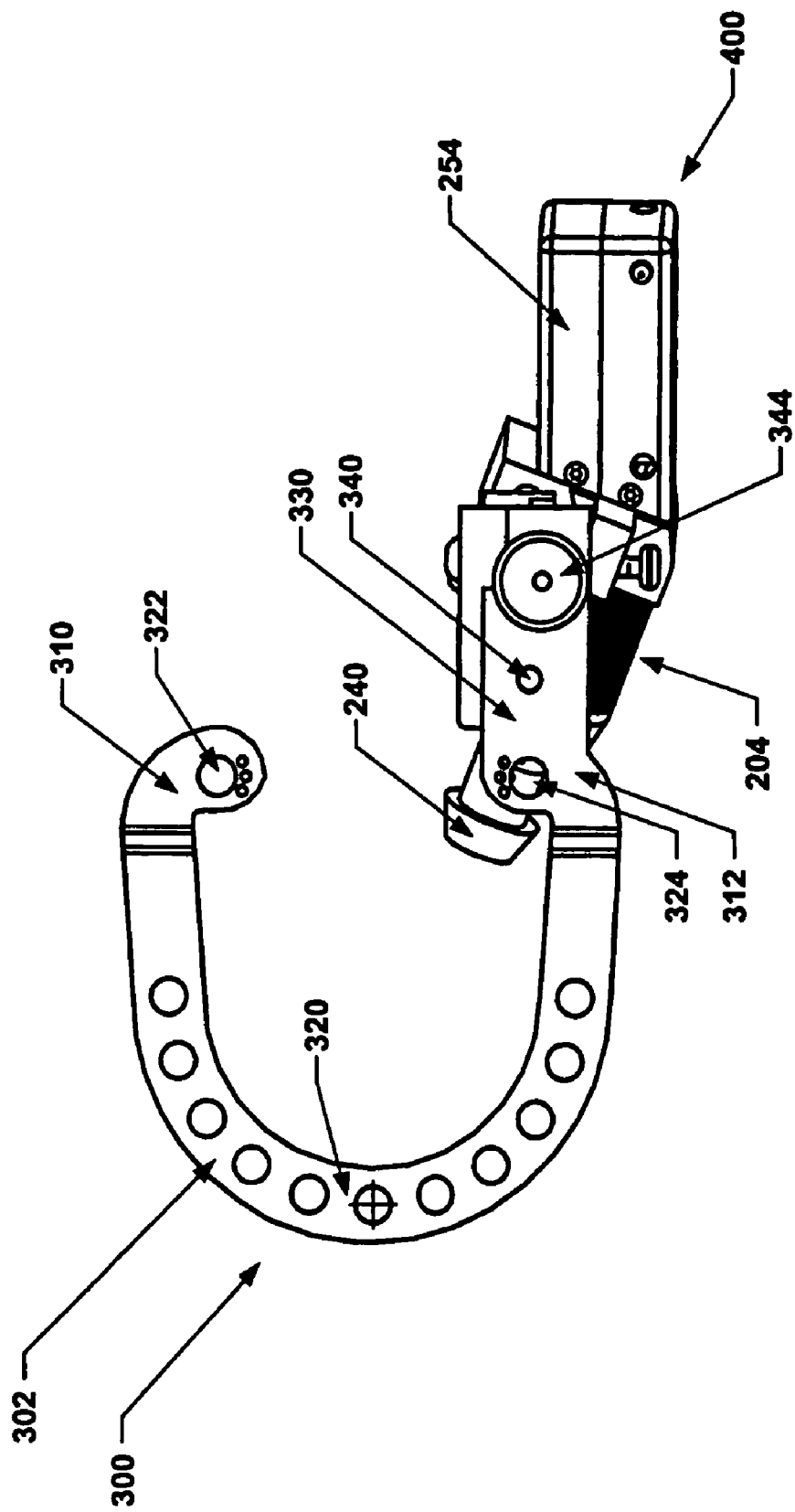
FIG. 6A is a top view of the lighting system of FIG. 5A.
Figure 6B:
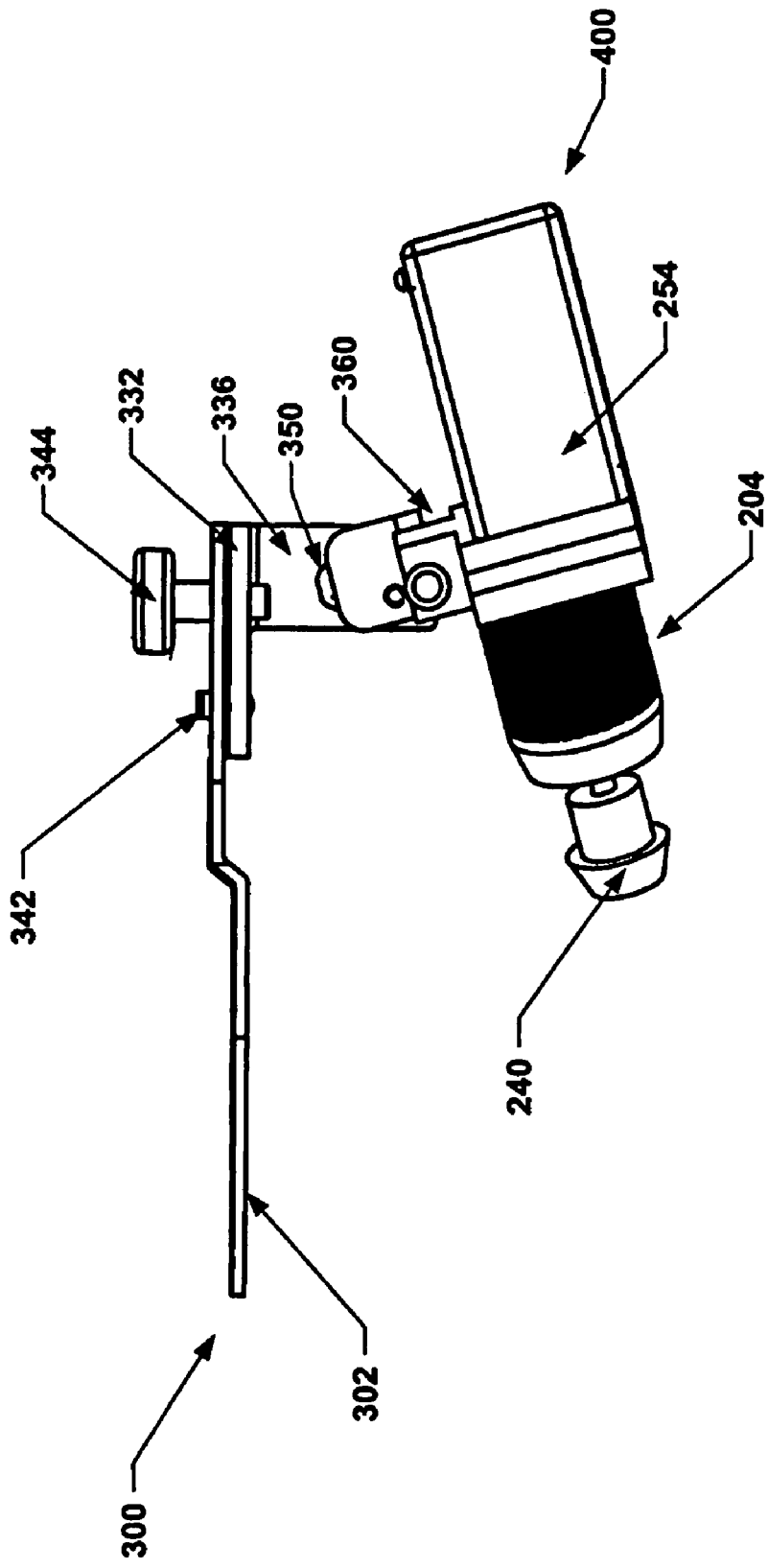
FIG. 6B is a side view of the lighting system of FIG. 5A.

FIG. 6A is a top view of lighting system 300, and FIG. 6B is a side view of lighting system 300. As shown in FIGS. 5A–6B, upper rear struts 122 include at least two mounting apertures 306, 308 formed therein for mounting brake arms 316, 318 of a rear brake 314 to upper rear struts 122. Support beam 302 is positioned between brake arms 316, 318 and upper rear struts 122. Mounting apertures 322, 324 allow support beam 302 to be secured to upper rear struts 122 via fasteners 326, 328, such as shaft bolts and securing nuts, that allow brake arms 314, 316 to pivot about upper rear struts 122.

First beam end 310 includes a mounting aperture 322 adapted to receive shaft bolt 326 of brake arm 314 such that end 310 is clamped between brake arm 314 and upper rear strut 122 when brake arm 314 is fastened to strut 122.

Second beam end 312 includes a mounting aperture 324 adapted to receive shaft bolt 328 of brake arm 316 such that end 312 is clamped between brake arm 316 and strut 122 when brake arm 316 is fastened to strut 122. Beam end 312 includes an accessory mounting portion 330 having a generator mounting aperture 332 formed therein for mounting generator 204 to support beam 302. Generator 204 is secured to support beam 302 via a fastener 334 that extends through aperture 332 and couples to a mounting block 336. Support beam 302 further includes an aperture 340 that receives a pin 342 from mounting block 336 when mounting block 336 is mounted to support beam 302. Pin 342, when positioned in aperture 340, inhibits mounting block 336 from rotating about support structure 302.

Generator 204 is secured to mounting block 336 through a pivotal connection 340 to support beam 202 that allows drive wheel 240 to contact a portion of rear wheel 108, such as the sidewall of rim 134 or rear tire 136. A torsion spring 360 extends around pivotal connection 340 between mounting block 336 and generator 204. Spring 360 torsionally biases drive wheel 240 against rear wheel 108 so that drive wheel 240 remains in contact with rear wheel 108 and provides generating power when rear wheel 108 is in motion.

Housing 254 encloses voltage control system 400. Generator 204 and housing 254 are pivotally mounted to support beam 302 via mounting block 336. As previously described, housing 254 is secured to generator 204 at a position opposite drive wheel 240 to allow electrical connections between generator 204 and voltage control system 400 to be made without interference from the rotation of wheel 108.

Figure 7A:
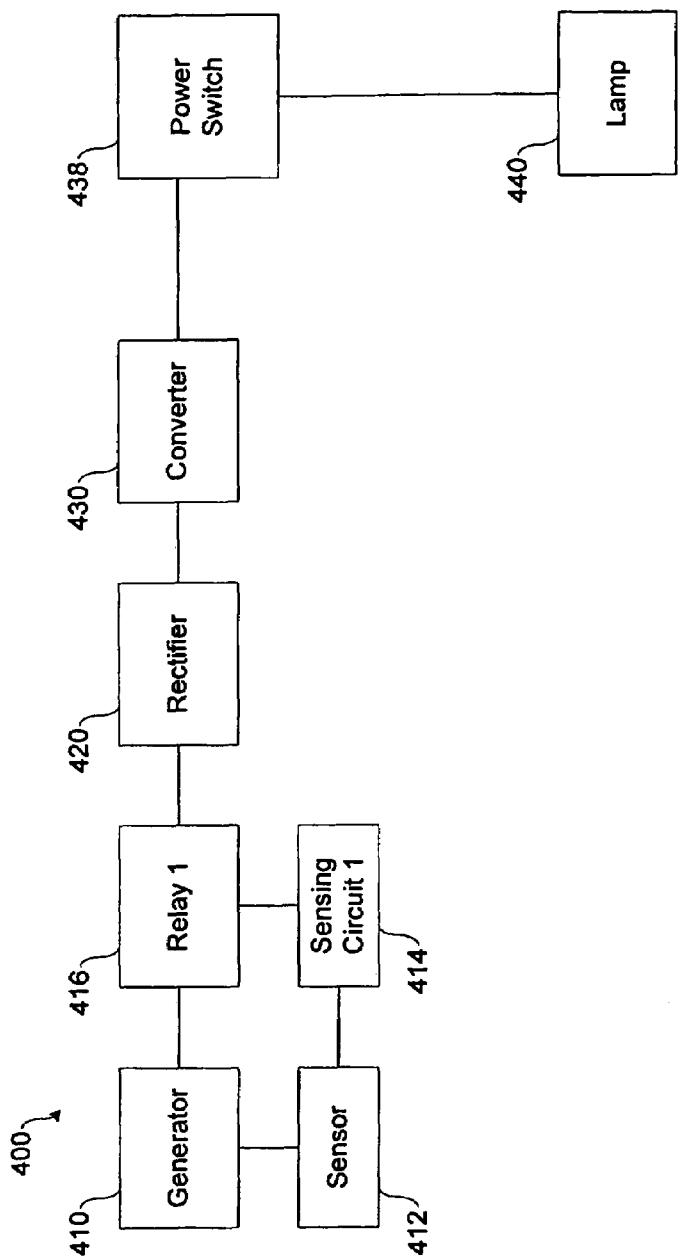
FIG. 7A is a block diagram of one embodiment of a voltage control system.

FIG. 7A is a block diagram of voltage control system 400. System 400 includes a generator 410 such as, for example, generator 204 of FIGS. 1A–6B, which is driven by frictional engagement against rear wheel 108. In one embodiment, the generator 204 is a three-phase generator that provides a three-phase output voltage 380, as shown in FIG. 8A, in the form of sine waves with positive and negative halves 382, 384.

In one aspect, generator 410 provides a three-phase output voltage that is generally linearly proportional to the speed of bicycle 102. For example, as the speed of bicycle 102 increases, the amplitude of the voltage increases in a generally linear manner. Likewise, as the speed of bicycle 102 decreases, the amplitude of the voltage decreases in a generally linear manner.

Rectifier 420 receives and rectifies the three-phase output voltage of generator 410 by inverting the negative halves 384, as shown in FIG. 8B, of the sine waves generated by generator 410. In one embodiment, rectifier 410 comprises a three-phase full-bridge rectifier and provides a DC output voltage 390, as shown in FIG. 8B. A filter circuit having one or more capacitors could be connected to the output of rectifier 420 to smooth the output voltage by reducing the peak-to-peak ripple voltage of the rectifier output as shown in FIG. 8B.

DC-to-DC converter 430 changes the DC output voltage 422 received from rectifier 420 to a first working voltage. In one embodiment, the first working voltage is a regulated DC voltage between approximately 9 volts and 12 volts. More particularly, the first working voltage is a regulated voltage of approximately 10.6 volts. For a received DC voltage of approximately 12 volts or above, converter 430 provides a first regulated working voltage of approximately 10.6 volts. The first working voltage is adjustable depending on the desired load.

A lamp 440 is attached to a portion of the bicycle 102, such as the handlebars, and receives the first working voltage from converter 430 via a power switch 438.

Sensor 412 monitors generator 410 and provides an output signal proportional to the speed of bicycle 104. In one embodiment, sensor 412 comprises a hall effect sensor that is triggered by permanent magnets in generator 410 by sensing the magnetic field of the permanent magnets. In general, generator 410 includes at least two permanent magnets positioned opposite each other in a stationary manner within the housing of generator 410. Generator 410 also includes a series of windings on a shaft that rotates within the generator housing. Sensor 412 is positioned within generator 410 and between the windings so as to rotate therewith. When the shaft of generator 410 rotates, sensor 412 provides a pulse when each of the permanent magnets are sensed. Therefore, with each rotation of the shaft, sensor 412 provides two pulses for each of the two magnets sensed.

In one embodiment the generator wheel to rear wheel ratio is approximately 26 to 1. This allows sensor 412 to have a resolution of over approximately 50 to 1 with rear wheel rotation. The resolution of sensor 412 can be adjusted to different values depending on the application without departing from the scope of the invention.

In one embodiment, the output signal from sensor 412 comprises a rectangular pulse having a frequency proportional to the rate of rotation of generator 204. The rate of rotation of generator 410 is proportional to the rate of rotation of rear wheel 108. The rate of rotation of rear wheel 108 is proportional to the speed of bicycle 102. Sensor 412 provides approximately two rectangular pulses for each rotation of generator 410. Generator 410 rotates approximately 25 to 27 times for each rotation of rear wheel 108. Hence, sensor 412 provides approximately 50 to 54 rectangular pulses for each rotation of wheel 108. The number of rectangular pulses provided by sensor 412 can be adjusted to different values depending on the application without departing from the scope of the invention.

A first sensing circuit 414 receives the output signal from sensor 412 and provides a first control signal at a first predetermined value of the sensor output signal. First sensing circuit 414 receives the sensor output signal and determines if it is above the first predetermined value. In one embodiment, the first predetermined value corresponds to a predetermined number of pulses received by first sensing circuit 414 from sensor 412. In general, the number of pulses received within a particular period of time corresponds to the approximate speed of rear wheel 108 and, hence, to the speed of bicycle 102. When the first predetermined value is determined, first sensing circuit 414 provides a first control signal as an output voltage.

The first predetermined value is configured depending on the type of bicycle. The first predetermined value for road bikes, for example, may correspond to bicycle speeds of approximately 18–20 mph, while the first predetermined value for mountain bikes may correspond to bicycle speeds of approximately 10–15 mph. The size of drive wheel 240 can be adjusted to configure the first predetermined value for different types of bicycles.

First relay 416 is connected between generator 410 and rectifier 420 to first sensing circuit 414 to receive the first control signal. Relay 416, during a state of increasing bicycle speed, changes the output voltage of generator 410 from a three-phase line-to-line voltage to a single-phase line-to-neutral voltage when the first control signal is received from first sensing circuit 414 at the predetermined value. In other words, during a state of increasing bicycle speed, relay 416 changes the input voltage to rectifier 420 from a three-phase line-to-line voltage to a single-phase line-to-neutral voltage when the first control signal is received from first sensing circuit 414 at the predetermined value.

The DC output voltage from rectifier 420 is effectively reduced to an amount that will not damage converter 430 or any other part of voltage control system 400 while supplying the working voltage to lamp 440. The change from a three-phase to a single-phase output voltage improves the efficiency of the generator-rectifier system of the present teachings by allowing DC-to-DC converter 430 to operate in a more efficient region of its operating curve.

In general, relays have coils that, when a voltage is applied to the coil, provide a magnetic field to pull a switch between at least two different states. The relay can also have a double pull configuration that allows switching between multiple signal paths.

In one embodiment, at bicycle speeds between approximately 3 mph and 17 mph, first relay 416 receives the control signal from first sensing circuit 414 and allows generator 502 to supply the three-phase line-to-line voltage to rectifier 420. Rectifier 420 rectifies the received three-phase line-to-line voltage and supplies a DC output voltage to converter 430 in the form of a rectified three-phase line-to-line voltage.

In another embodiment, at bicycle speeds of approximately 18 mph and above, first relay 416 receives the control signal from first sensing circuit 414 at the first predetermined value and switches to allow generator 502 to supply a single-phase line-to-neutral voltage to rectifier 420. Rectifier 420 rectifies the single-phase line-to-neutral voltage and supplies a reduced DC output voltage to the converter 430 in the form of a rectified single-phase line-to-neutral voltage, which effectively reduces the amplitude of the DC output voltage. In one example, the amplitude of the DC output voltage is reduced to between approximately 25% to 65% of the three-phase line-to-line voltage. In another example, the amplitude of the DC output voltage is reduced to between approximately 30% to 50% of the three-phase line-to-line voltage. At high bicycle speeds, this reduction prevents damage to converter 430 and also reduces the load on generator 410, which reduces the drag on bicycle 102.

In general, converter 430 can accept voltages between approximately 12 volts to 100 volts. At high bicycle speeds, generator 410 can provide voltages of up to approximately 160 volts. Such high voltages can damage the circuitry of converter 430 and other parts of the voltage control system circuitry, which can cause voltage control system 400 to stop functioning properly.

During a state of decreasing speed, when the predetermined value is reached, relay 416 restores the generator output voltage to the three-phase line-to-line voltage. Converter 430 continuously supplies the first working voltage to lamp 440 while receiving the variable DC output voltage from rectifier 420.

Power switch 438 is connected between converter 430 and lamp 440 to selectively allow the working voltage from converter 430 to reach lamp 440.

Figure 7B:
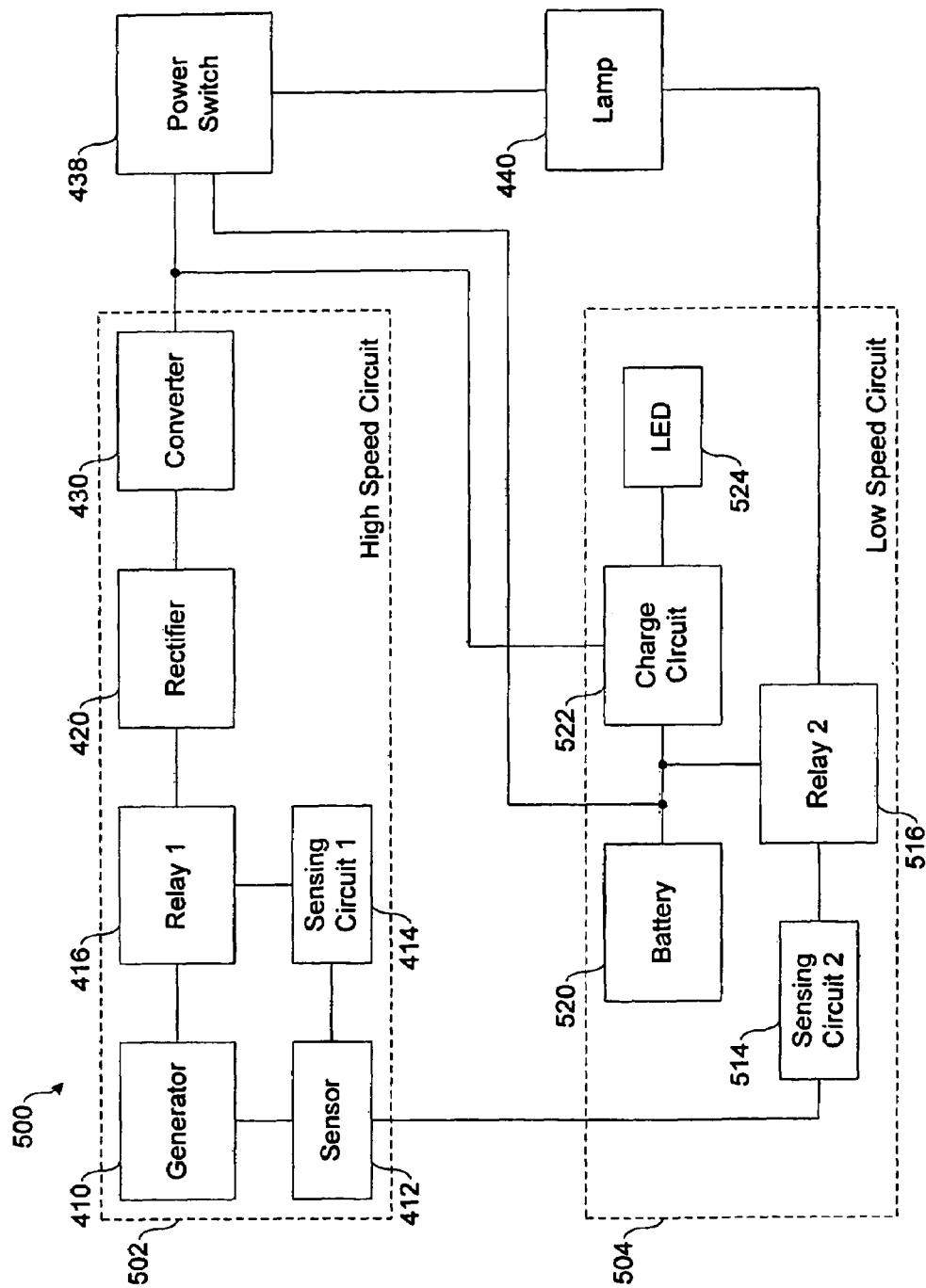
FIG. 7B is a block diagram of another embodiment of a voltage control system.

FIG. 7B is a block diagram of another embodiment of a voltage control system 500. System 500 includes a high speed circuit 502 and a low speed circuit 504.

High speed circuit 502 includes generator 410, rectifier 420, converter 430, sensor 412, first sensing circuit 414, and first relay 416 of FIG. 7A. In one embodiment, high speed circuit 504 provides DC voltage to lamp 440 at speeds above approximately 5 mph, and low speed circuit 504 provides DC voltage to lamp 440 at speeds below approximately 5 mph.

Low speed circuit 504 includes a second sensing circuit 514 that receives the output signal from sensor 412 and provides a second control signal at a second predetermined value of the sensor output signal. Second sensing circuit 514 receives the sensor output signal and determines if it is below the second predetermined value. In one embodiment, the second predetermined value corresponds to bicycle speeds of approximately 3–6 mph, and more particularly to a bicycle speed of approximately 3.5 mph.

Battery 520 provides a second working voltage. A second relay 516 is connected to battery 520 and to second sensing circuit 514 to receive the second control signal. Second relay 516 provides the second working voltage from battery 520 to lamp 440 when the second control signal is received from second sensing circuit 514. In one embodiment, battery 520 provides a second working voltage between approximately 3 volts to 6 volts and preferably approximately 3.6 volts. In another embodiment, battery 520 comprises a small lithium ion battery, which reduces the overall weight of system 400 when compared to conventional battery systems.

Charge circuit 522 is connected to converter 430 to receive the working voltage from converter 430 when high speed circuit 502 is providing the working voltage. Charge circuit 522 is further connected to battery 520 to charge battery 520 when the working voltage is received from converter 430. In one embodiment, charge circuit 522 charges battery 520 when battery 520 has a low charge, and does not charge battery 520 when battery 520 is charged. In another embodiment, charge circuit 522 is configured to charge battery 522 to greater than approximately 4 volts. Moreover, low speed circuit 520 also includes an indicator lamp 524, such as an LED, that indicates when charge circuit 522 is charging battery 520.

Power switch 438 is connected between converter 430 and lamp 440 to selectively allow the first working voltage from converter 430 to reach lamp 440 and charge circuit 522. Power switch 438 can also be connected between battery 520 and lamp 440 so as to selectively allow the second working voltage from battery 520 to reach lamp 440.

In one embodiment, at bicycle speeds of less than approximately 5 mph, second relay 516 receives the control signal from second sensing circuit 514 at the second predetermined value and switches to allow battery 520 to supply the second working voltage to lamp 440. At increasing bicycle speeds above approximately 5 mph, second relay 516 receives the control signal from second sensing circuit 514 and switches off supply of the second working voltage from battery 520 to lamp 440. At high bicycle speeds above approximately 5 mph, battery 520 does not supply the second working voltage to lamp 440. Also, at high bicycle speeds, charge circuit 522 receives the first working voltage from converter 430 and proceeds to charge battery 520 if battery 520 charge is low and requires charging.

First relay 416, during a state of decreasing speed, restores the generator output voltage to the three-phase line-to-line voltage when the predetermined value is reached. Converter 430 continuously supplies the first working voltage to lamp 440 while receiving the variable DC output voltage from rectifier 420.

Figure 7C:
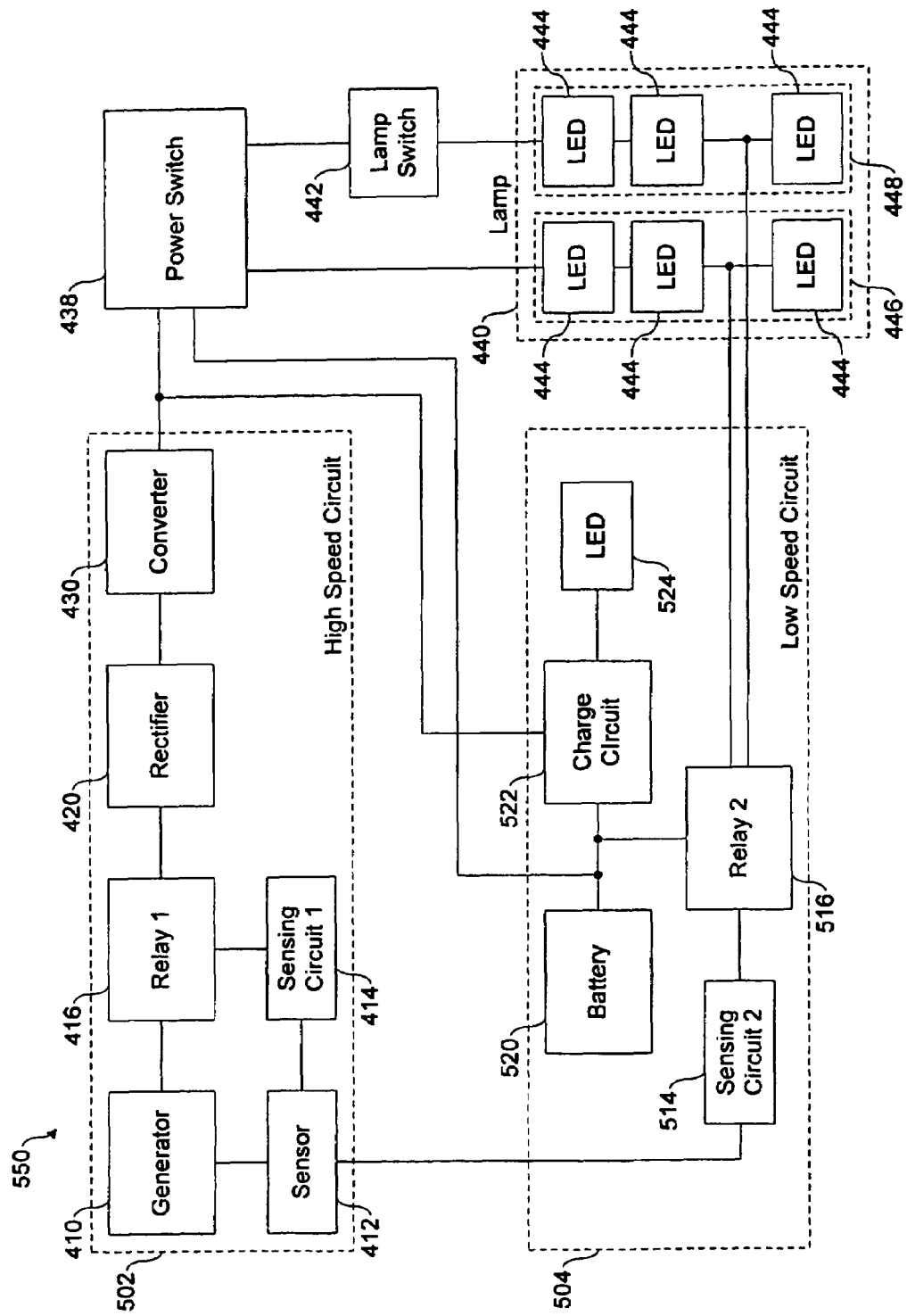
FIG. 7C is a block diagram of still another embodiment of a voltage control system.

FIG. 7C is a block diagram of still another embodiment of a voltage control system 550 having a lamp 440. In one embodiment, lamp 440 includes a plurality of lamps 444, such as LEDs (light emitting diodes), in at least two groups 446, 448 that are selectively powered by either the working voltage from converter 430 or the voltage from battery 520. At bicycle speeds of less than approximately 5 mph, second relay 516 receives the control signal from second sensing circuit 514 and switches to allow battery 520 to supply the second working voltage to at least two of the plurality of lamps 444. At bicycle speeds of approximately 5 mph and above, converter 430 supplies the first working voltage to at least one of groups 446, 448 of lamps 444. Lamp switch 442 selectively powers the second group 448 of lamps 444 to allow a brightness selection of either a high brightness with at least two groups 446, 448 of lamps 444 or low brightness with at least one group 446 of lamps 444.

Figure 9:
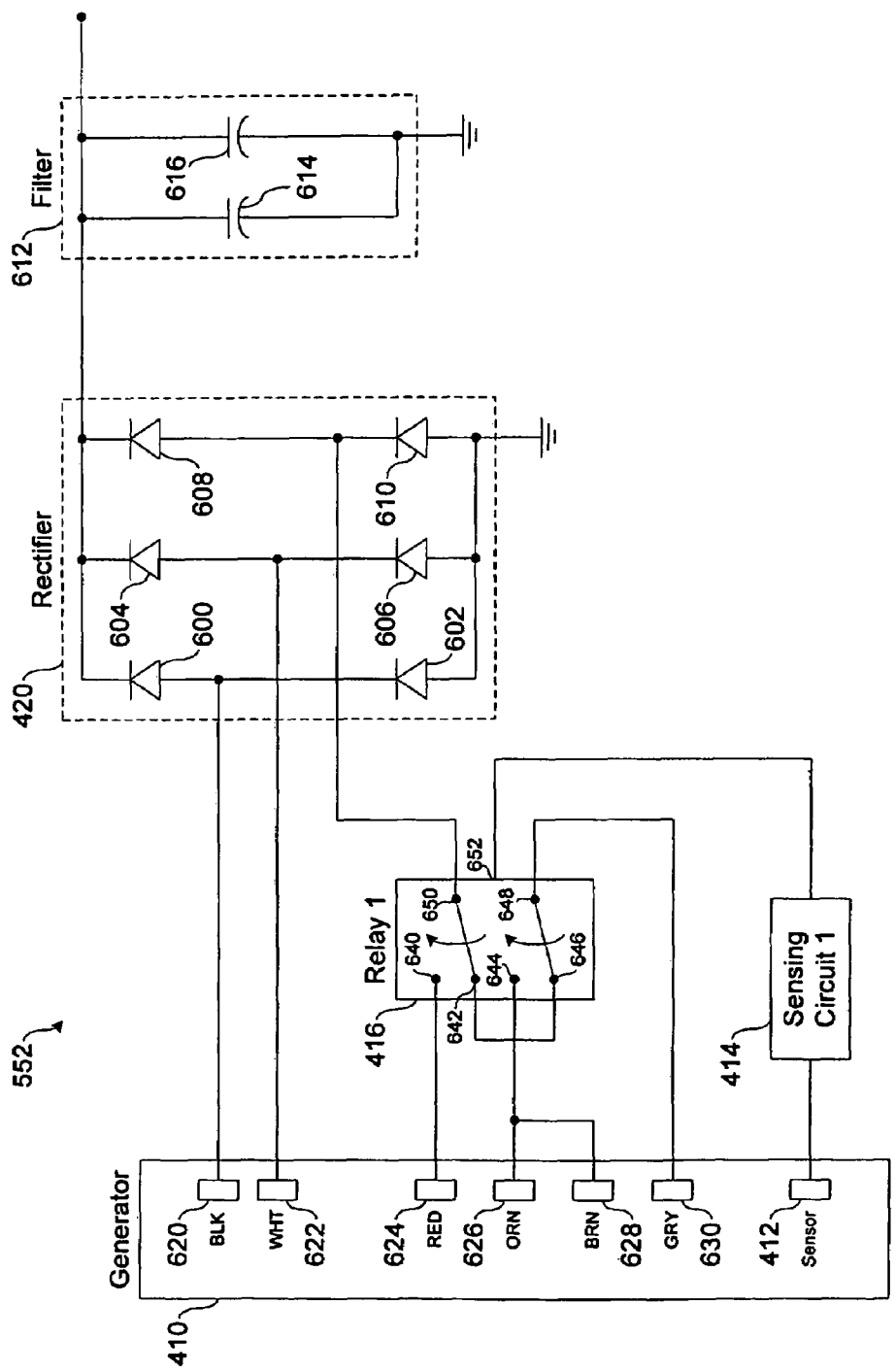
FIG. 9 is a diagram for a rectifier circuit.

FIG. 9 is a diagram of a rectifier circuit 552. In one embodiment, rectifier circuit 552 includes a rectifier 420 having at least six diodes 600, 602, 604, 606, 608, 610 configured to rectify the three-phase output voltage from generator 410. The six diodes 600, 602, 604, 606, 608, 610 are divided into three groups of two (600, 602), (604, 606), (608, 610). The three groups of diodes (600, 602), (604, 606), (608, 610) are connected in parallel, and each group of two diodes (600, 602), (604, 606), (608, 610) is connected in series.

In one embodiment, generator 410 includes at least six terminals 610, 612, 614, 616, 618, 620. First relay 416 includes at least seven terminals 640, 642, 644, 646, 648, 650, 652. A first terminal 620 of generator 410 is connected between a first group of serially connected diodes (600, 602). A second terminal 622 of generator 410 is connected between a second group of serially connected diodes (604, 606). A third terminal 624 of generator 410 is connected to a first terminal 640 of first relay 416. Fourth and fifth terminals 626, 628 of generator 410 are connected to a third terminal 644 of first relay 416. A sixth terminal of generator 410 is connected to a fifth terminal 648 of first relay 416. Second and fourth terminals 642, 646 of first relay 416 are connected together. A sixth terminal 650 of first relay 416 is connected between a third group of serially connected diodes (608, 610). The output of first sensing circuit 414 is connected to an input terminal 652 of first relay 416.

First relay 416 is configured to switch the output voltage of generator 410 from a three-phase line-to-line voltage to a three-phase line-to-neutral voltage when the control signal is received from first sensing circuit 414. First relay 416 is also configured to switch the output voltage of generator 410 back to the three-phase line-to-line voltage when the control signal is not received from first sensing circuit 414. First relay 416 allows a reduction in amplitude of the DC voltage supplied by rectifier 420 to converter 430 during high speeds of bicycle 102.

In addition, a filter circuit 602 having one or more capacitors 604 can be connected to the output of the rectifier 420. In one embodiment, the filter circuit 602 includes at least two capacitors 604 connected in parallel to the output of the rectifier 420. The filter circuit 602 functions to smooth the rectified output voltage of the rectifier 420 by reducing the peak-to-peak ripple voltage of the rectifier output as shown in FIG. 8B.

Figure 10:
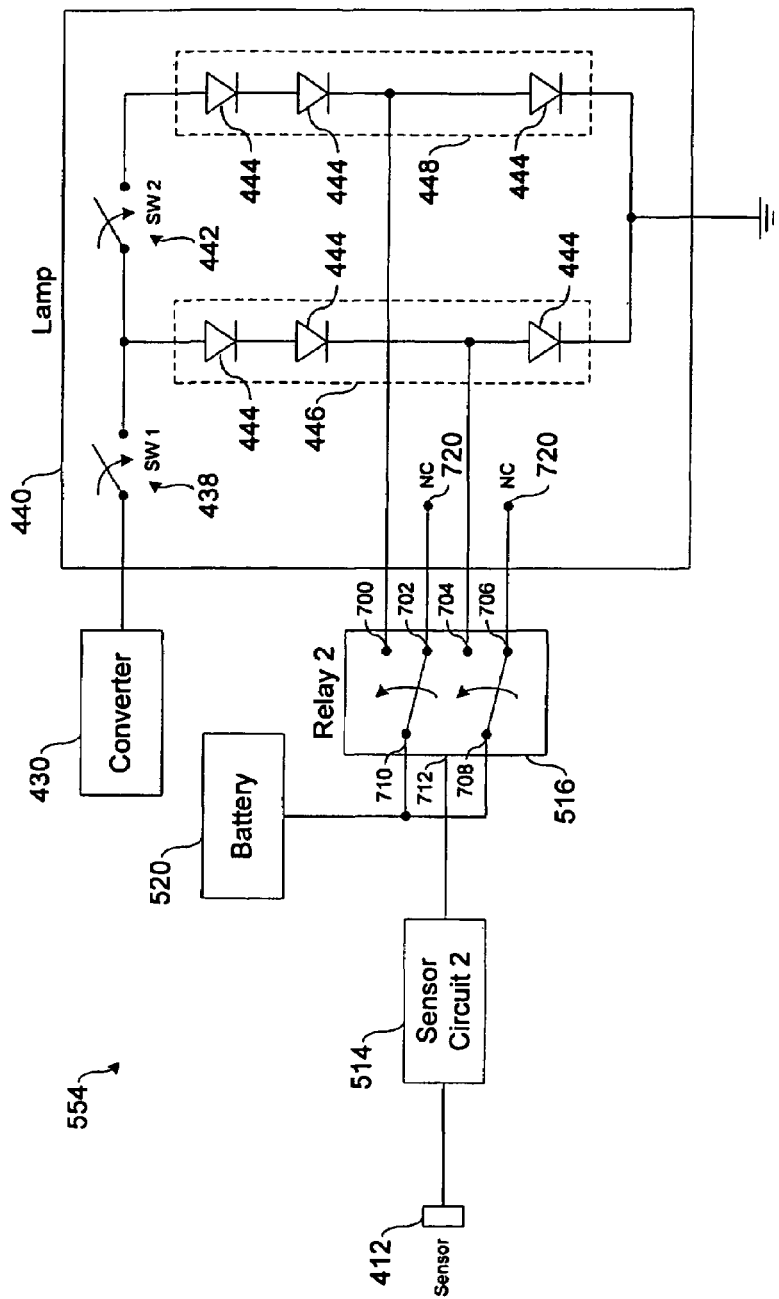
FIG. 10 is a diagram for a lamp circuit.

FIG. 10 is a diagram of lamp circuit 554. In one embodiment, lamp circuit 554 includes the lamp 440 of FIG. 7C having the plurality of lamps 444 configured in two groups 446, 448 of three lamps 444. The two groups 446, 448 are connected in parallel, and the three lamps 444 of each group 446, 448 are connected in series. The first working voltage from converter 430 is supplied to the first group 446 of lamps via power switch 438 and to the second group 448 via power switch 438 and lamp switch 442. Power switch 438 allows the first working voltage to be selectively supplied to both groups 446, 448 of lamps 444, and lamp switch 442 allows the first working voltage to be selectively supplied to the second group 448 of lamps 444.

Second relay 516 includes at least seven terminals 700, 702, 704, 706, 708, 710, 712. A first terminal 700 of second relay 516 is connected to at least one of the lamps 444 in the second group 448 of lamps 444. A third terminal 704 of second relay 516 is connected to at least one of the lamps 444 in the first group 446 of lamps 444. Second and fourth terminals 702, 706 of second relay 516 are left open or no connection (NC) 720 is provided. Fifth and sixth terminals 710, 712 of second relay 516 are connected to battery 520. The output of second sensing circuit 514 is connected to an input terminal 712 of second relay 416.

Moreover, second relay 516 is configured to switch to the output voltage of battery 520 when the control signal is received from second sensing circuit 514. Second relay 516 is also configured to switch off the output of the second working voltage of battery 520 when the control signal is not received from second sensing circuit 514. Second relay 516 allows battery 520 to supply the second working voltage to at least two of the lamps 444 during low speeds of bicycle 102.

Figure 11A:
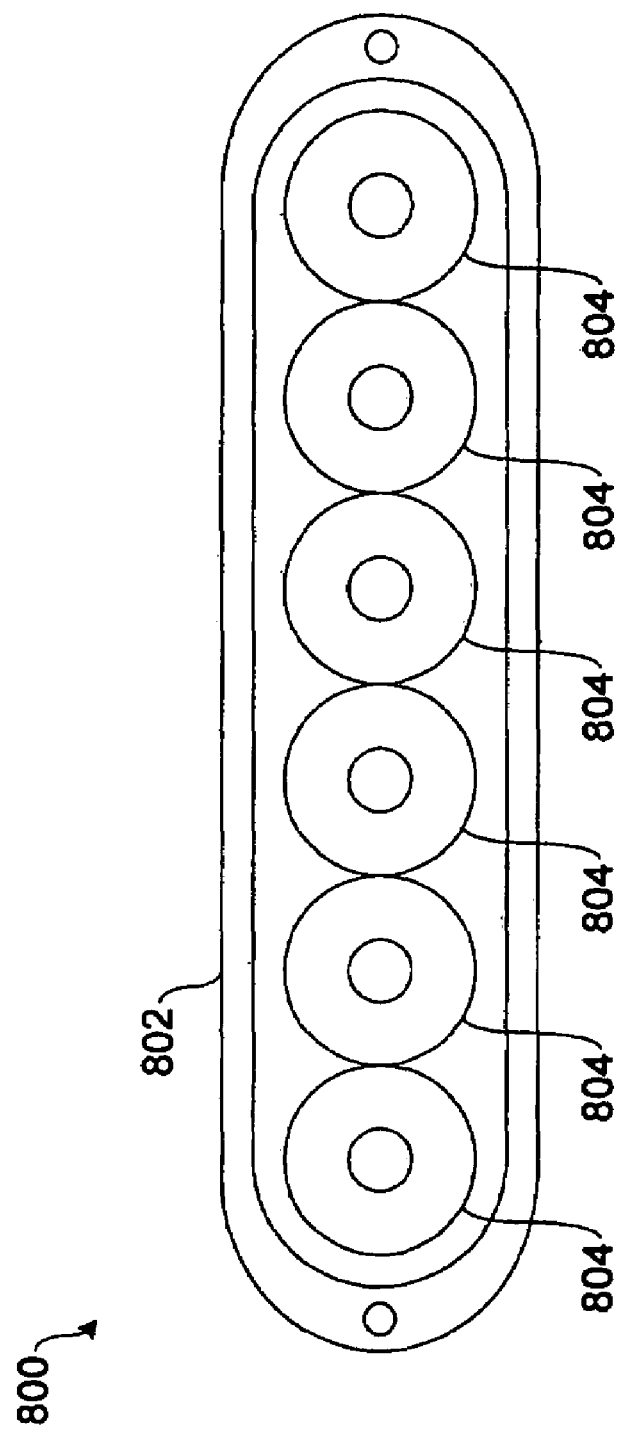
FIG. 11A is a top view of one embodiment of a lamp.
Figure 11B:
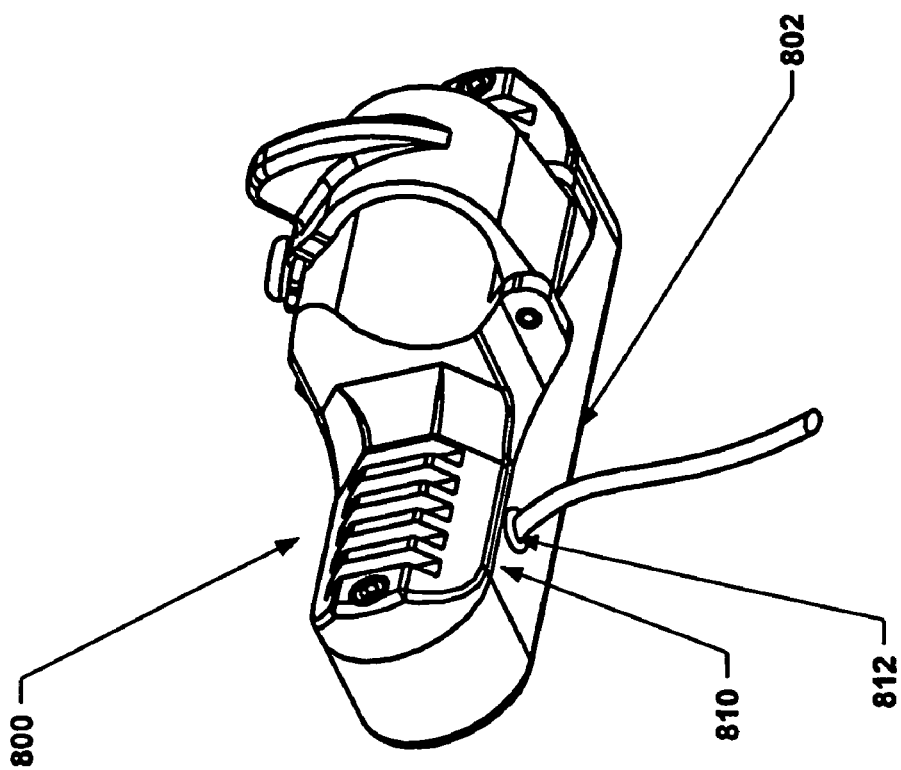
FIG. 11B is a rear perspective view of the lamp of FIG. 11A.

FIG. 11A is a top view of one embodiment of a lamp 800, and FIG. 11B is a rear perspective view of lamp 800. Lamp 800 includes a housing 802 and at least six lamps 804, such as LEDs, positioned within housing 802 adjacent each other in a single line. The face of lamps 804 can be positioned so as to be flush mounted with the face of housing 802. In one aspect, lamps 804 are electrically connected to voltage control system 400 and configured in a manner as previously described with reference to lamp 440 of voltage control system 400.

Housing 802 is formed of a rigid material, such as various types of metals including aluminum, various types of plastics, etc., and includes one or more straps or anchors 808 for attaching lamp 800 to a portion of bicycle 102, such as the handlebars or the bicycle frame. In one embodiment, anchor 808 is formed of a rubber material that is flexible so as to wrap around a structural portion of the handlebars or bicycle frame. In another embodiment, anchor 808 is formed of a rigid material, such as various types of metals including aluminum, various types of plastics, etc. Anchor 808 couples to the housing 802 and biases the housing 802 against the structural portion of the handlebars or bicycle frame so as to provide secure attachment thereto as shown in FIGS. 1A and 5A. The straps or anchors 808 provide an easily adjustable, easily mountable, and lightweight means for attaching the lamp 400 to a portion of the bicycle 102. Moreover, housing 802 includes a rear protrusion 810 with an aperture 812 formed therein that is adapted to receive electrical wiring for wiring lamps 804 to voltage control system 400. The wiring extends the length defined between the mounting position of lamp 800 and the mounting position of voltage control system 400.

Figure 12A:
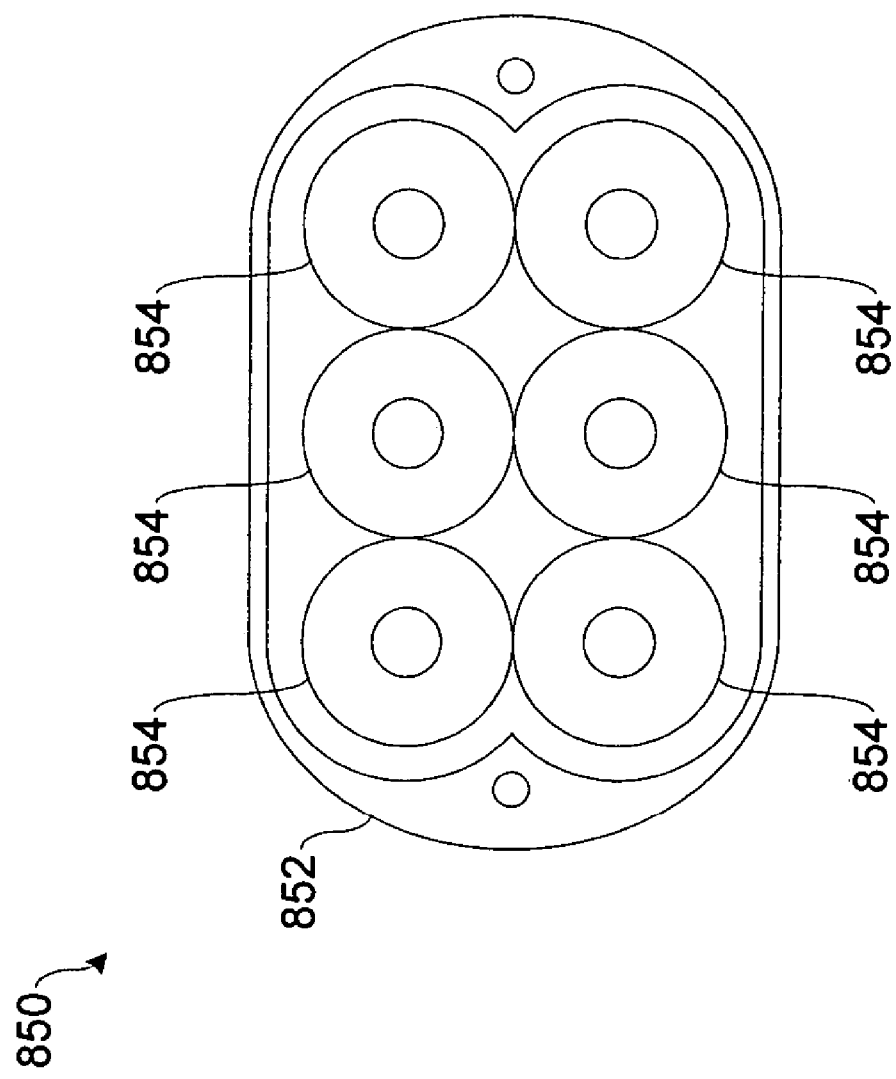
FIG. 12A is a top view of another embodiment of a lamp.
Figure 12B:
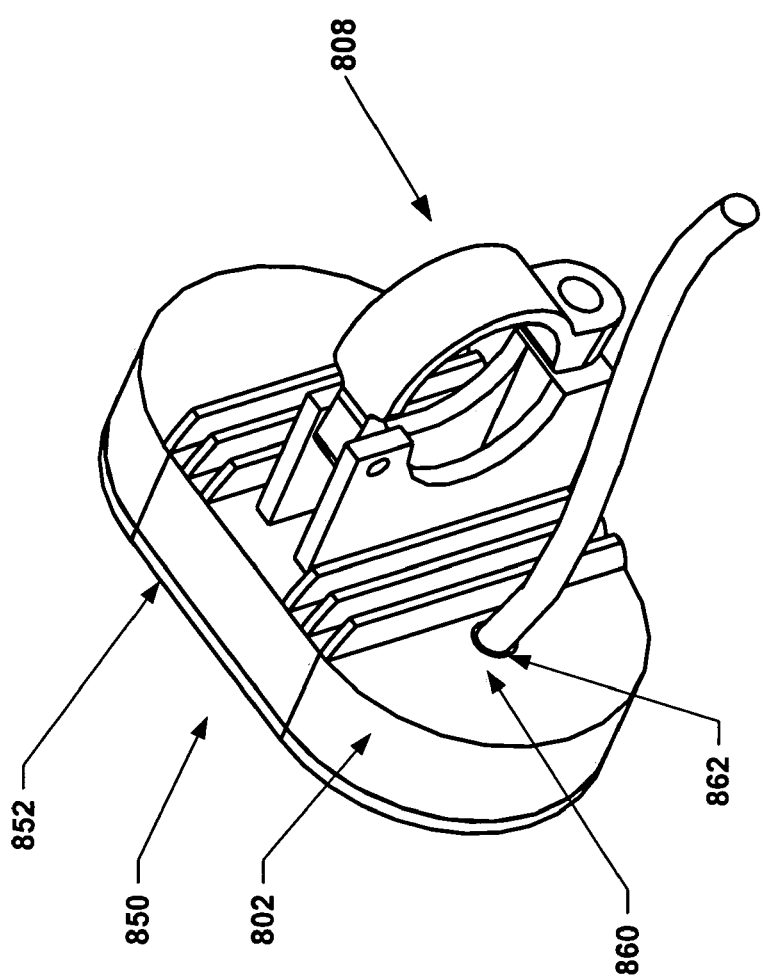
FIG. 12B is a rear perspective view of the lamp of FIG. 12A.

FIG. 12A is a top view of another embodiment of a lamp 850, and FIG. 12B is a rear perspective view of lamp 850. Lamp 850 includes a housing 852 and at least six lamps 854, such as LEDs, positioned within housing 852 in two groups of three so as to be adjacent each other with one group of lamps 854 positioned parallel to the other group of lamps 854. The face of lamps 854 can be positioned so as to be flush mounted with the face of housing 852. In one aspect, lamps 854 are electrically connected to voltage control system 400 and configured in a manner as previously described with reference to lamp 440 of FIGS. 7A, 7B, 7C, 10.

As with lamp 800 of FIGS. 11A–11B, housing 852 is formed of a rigid material, such as various types of metals including aluminum, various types of plastics, etc., and includes one or more straps or anchors 858 for attaching lamp 850 to a portion of bicycle 102, such as the handlebars or the bicycle frame. In one embodiment, anchor 858 is formed of a rubber material that is flexible so as to wrap around a structural portion of the handlebars or bicycle frame. In another embodiment, anchor 858 is formed of a rigid material, such as various types of metals including aluminum, various types of plastics, etc. Similar to anchor 808 in FIGS. 11A–11B, anchor 858 couples to the housing 852 and biases the housing 852 against the structural portion of the handlebars or bicycle frame so as to provide secure attachment thereto as shown in FIGS. 1A and 5A. The straps or anchors 858 provide an easily adjustable, easily mountable, and lightweight means for attaching the lamp 400 to a portion of the bicycle 102. Moreover, housing 802 includes a rear protrusion 860 with an aperture 862 formed therein that is adapted to receive electrical wiring for wiring lamps 854 to voltage control system 400. The wiring extends the length defined between the mounting position of lamp 850 and the mounting position of voltage control system 400.

By utilizing the inventive generator lighting system described herein, a bicycle rider can enjoy high output light from a compact, low weight system that provides low drag. The lighting system is easily removed and reattached in a short period of time, requires virtually no maintenance, especially in the form of battery charging, and will fit universally onto many modern bicycles. The inventive system is capable of similar or improved performance in many levels of common riding from low speeds and occasional stopping to very high speeds.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lighting system for a bicycle comprising:
a beam configured to be mounted to the bicycle;
a generator mounted to said beam such that said beam holds said generator in position to be frictionally driven by contact with a wheel of the bicycle, said generator providing a three-phase output voltage;
a sensor that monitors said generator and provides an output signal proportional to bicycle speed; and
a first sensing circuit that receives said output signal and provides a first control signal when said output signal exceeds a first predetermined value, the first control signal being operative to change the output voltage from the three-phase output voltage to a single-phase output voltage to prevent damage to said system.

2. The system of claim 1, wherein the bicycle includes at least one rear strut for supporting a wheel mount, said beam extending generally alongside the rear strut with a first beam end mounted to the wheel mount and a second beam end mounted to the bicycle frame.

3. The system of claim 2, wherein said beam includes an elongate portion with a non-cylindrical cross-section that extends between said first and second beam ends.

4. The system of claim 2, wherein the second beam end extends 90° from a plane of the first beam end.

5. The system of claim 2, wherein the wheel mount includes a side open aperture that is adapted to receive a shaft of a rear axle of the rear wheel, said first beam end includes a downwardly facing, side open aperture adapted to extend around the shaft of the rear axle and to be clamped between the rear wheel axle and the rear wheel mount, said first beam end is clamped in position when the rear wheel is fastened to the rear wheel mount.

6. The system of claim 2, wherein the bicycle frame includes a cross member outbound of the rear wheel having a mounting aperture for receiving a shaft of a rear caliper brake, said second beam end includes a side open aperture adapted to extend around the shaft of the rear caliper brake and to be clamped between the cross member and the rear caliper brake, said second beam end is clamped in position when the rear caliper brake is fastened to the cross member.

7. The system of claim 2, wherein the generator includes a drive wheel, and wherein the generator is connected to the strut through a pivotal connection to the beam in a position to place the drive wheel against a portion of the rear wheel.

8. The system of claim 7, further comprising a torsion spring extending around the pivotal connection, said spring connected at one end to the beam and at the other end to the generator, said spring torsionally biases the drive wheel against a portion of the rear wheel.

9. The system of claim 2, wherein the rear wheel includes a rim and a tire, and wherein said beam holds the generator in position to be frictionally driven by contact with at least one of the rim and the tire.

10. The system of claim 1, wherein said generator provides a three-phase output voltage in the form of sine waves with positive and negative halves.

11. The system of claim 10, further comprising a three-phase full-bridge rectifier that receives the three-phase output voltage of said generator and inverts the negative halves of the sine waves generated, said rectifier providing a DC output voltage.

12. The system of claim 11, further comprising a DC-to-DC converter for changing the DC output voltage from said rectifier to a first working voltage.

13. The system of claim 12, wherein the first working voltage is a regulated voltage.

14. The system of claim 13, wherein the regulated voltage is between approximately 9 volts and 12 volts.

15. The system of claim 12, further comprising a lamp configured to be mounted to the bicycle, wherein said lamp receives the first working voltage from said converter.

16. The system of claim 15, further comprising a second sensing circuit that receives said output signal from said sensor and provides a second control signal at a second predetermined value of said output signal from said sensor.

17. The system of claim 16, further comprising a battery that provides a second working voltage and a second relay connected to said battery, said second relay connected to said second sensing circuit to receive said second control signal, said second relay providing the second working voltage from the battery to the lamp when said second control signal is received from said second sensing circuit.

18. The system of claim 17, further comprising a charge circuit connected to said converter to receive the first working voltage, said charge circuit further connected to said battery to charge the battery when the first working voltage is received from said converter.

19. The system of claim 15, further comprising a power switch connected between said converter and said lamp, said power switch selectively allows the first working voltage from said converter to reach the lamp.

20. The system of claim 15, wherein the lamp includes a plurality of lamps in at least two groups that are selectively powered by the first working voltage from said converter.

21. The system of claim 15, further comprising a first relay connected between said generator and said rectifier, said first relay being connected to said first sensing circuit to receive said first control signal, said first relay, during a state of increasing bicycle speed, changes the output voltage of said generator from said three-phase line-to-line voltage to a single-phase line-to-neutral voltage when said first control signal is received from said first sensing circuit, whereby said DC output voltage from said rectifier is reduced by an amount less than sufficient to damage said converter while supplying said first working voltage to said lamp.

22. The system of claim 21, wherein said first relay, during a state of decreasing speed, restores the generator output voltage to the three-phase line-to-line voltage at the predetermined value.

23. A voltage control system for a bicycle having a bicycle frame and at least two wheels, the system comprising:
  a generator driven by frictional engagement against a wheel of the bicycle, said generator providing a three-phase output voltage;
  a sensor that monitors said generator and provides an output signal proportional to the speed of the bicycle; and
  a first sensing circuit that receives said output signal from said sensor and provides a first control signal when said output signal exceeds a first predetermined value operative to change the output voltage from the three-phase output voltage to a single-phase output voltage to thereby prevent damage to said system.

24. The system of claim 23, further comprising a second sensing circuit that receives said output signal from said sensor and provides a second control signal at a second predetermined value of said output signal from said sensor.

25. The system of claim 24, further comprising a battery that provides a second working voltage and a second relay connected to said battery, said second relay connected to said second sensing circuit to receive said second control signal, said second relay providing the second working voltage from the battery to the lamp when said second control signal is received from said second sensing circuit.

26. The system of claim 25, further comprising a charge circuit connected to said converter to receive the first working voltage, said charge circuit further connected to said battery to charge the battery when the first working voltage is received from said converter.

27. The system of claim 23, wherein said generator provides a three-phase output voltage in the form of sine waves with positive and negative halves.

28. The system of claim 27, further comprising a three-phase full-bridge rectifier that receives the three-phase output voltage of said generator and inverts the negative halves of the sine waves generated, said rectifier providing a DC output voltage.

29. The system of claim 28, further comprising a DC-to-DC converter for changing the DC output voltage from said rectifier to a first working voltage.

30. The system of claim 29, wherein the first working voltage is a regulated voltage.

31. The system of claim 30, wherein the regulated voltage is between approximately 9 volts and 12 volts.

32. The system of claim 29, further comprising a power switch connected between said converter and said lamp, said power switch selectively allows the first working voltage from said converter to reach the lamp.

33. The system of claim 29, wherein the lamp includes a plurality of lamps in at least two groups that are selectively powered by the first working voltage from said converter.

34. The system of claim 29, wherein said lamp receives the first working voltage from said converter.

35. The system of claim 34, further comprising a first relay connected between said generator and said rectifier, said first relay being connected to said first sensing circuit to receive said first control signal, said first relay, during a state of increasing bicycle speed, changes the output voltage of said generator from said three-phase line-to-line voltage to a single-phase line-to-neutral voltage when said first control signal is received from said first sensing circuit, whereby said DC output voltage from said rectifier is reduced by an amount less than sufficient to damage said converter while supplying said first working voltage to said lamp.

36. The system of claim 35, wherein said first relay, during a state of decreasing speed, restores the generator output voltage to the three-phase line-to-line voltage at the predetermined value.

37. A voltage control system for a bicycle having a bicycle frame and at least two wheels, the system comprising:
  a three-phase generator driven by frictional engagement against a wheel of the bicycle, said generator providing a three-phase output voltage in the form of sine waves with positive and negative halves;
  a three-phase full-bridge rectifier that receives the three-phase output voltage of said generator and inverts the negative halves of the sine waves generated, said rectifier providing a DC output voltage;
  a DC-to-DC converter for changing the DC output voltage from said rectifier to a first working voltage;
  a lamp attached to a portion of the bicycle, said lamp receiving the first working voltage from said converter;
  a sensor that monitors said generator and provides an output signal proportional to the speed of the bicycle;
  a first sensing circuit that receives said output signal from said sensor and provides a first control signal at a first predetermined value of said output signal from said sensor; and
  a first relay connected between said generator and said rectifier, said first relay being connected to said first sensing circuit to receive said first control signal, said first relay, during a state of increasing bicycle speed, changes the output voltage of said generator from said three-phase line-to-line voltage to a single-phase line-to-neutral voltage when said first control signal is received from said first sensing circuit, whereby said DC output voltage from said rectifier is reduced by an amount less than sufficient to damage said converter while supplying said first working voltage to said lamp.

38. The system of claim 37, wherein the lamp includes a plurality of lamps in at least two groups that are selectively powered by the first working voltage from said converter.

39. The system of claim 37, further comprising at least one strap or anchor that is formed of a rubber material that is flexible so as to wrap around a portion of the bicycle, wherein the strap or anchor couples to the lamp and biases the lamp against a portion of the bicycle so as to provide secure attachment thereto.

* * * * *